US011168578B2

(12) United States Patent
Farrell

(10) Patent No.: US 11,168,578 B2
(45) Date of Patent: Nov. 9, 2021

(54) SYSTEM FOR ADJUSTING A VARIABLE POSITION VANE IN AN AIRCRAFT ENGINE

(71) Applicant: PRATT & WHITNEY CANADA CORP., Longueuil (CA)

(72) Inventor: Ian Farrell, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 82 days.

(21) Appl. No.: 16/560,295

(22) Filed: Sep. 4, 2019

(65) Prior Publication Data

US 2020/0080441 A1   Mar. 12, 2020

Related U.S. Application Data

(60) Provisional application No. 62/729,517, filed on Sep. 11, 2018.

(51) Int. Cl.
*F01D 17/16*  (2006.01)
*F02C 3/06*   (2006.01)

(52) U.S. Cl.
CPC .............. *F01D 17/16* (2013.01); *F02C 3/06* (2013.01); *F05D 2270/64* (2013.01)

(58) Field of Classification Search
CPC .......... F01D 17/16; F01D 17/20; F01D 17/26; F01D 17/02; F01D 17/08; F01D 17/162; F05D 2270/64; F05D 2260/53; F05D 2260/56; F05D 2260/57; F05D 2270/312; F05D 2270/301; F05D 2270/3013; F05D 2270/3015; F05D 2270/303; F05D 2270/313; F05D 2270/30; F05D 2270/80; F05D 2270/821; F04D 29/563; F02C 3/06

USPC .................................... 415/151, 53.3, 149.4
See application file for complete search history.

(56) References Cited

U.S. PATENT DOCUMENTS

| | | | | |
|---|---|---|---|---|
| 2,219,994 A | * | 10/1940 | Jung | F02C 3/36 60/39.15 |
| 2,613,029 A | * | 10/1952 | Wilde | F04D 27/0246 415/37 |
| 2,689,680 A | * | 9/1954 | Lovesey | F01D 17/162 415/26 |
| 2,764,868 A | * | 10/1956 | Bottoms | F02D 3/02 60/39.281 |
| 2,862,358 A | * | 12/1958 | Basford | F02C 7/22 60/794 |
| 2,929,546 A | * | 3/1960 | Wilkes, Jr. | F01D 17/162 415/37 |
| 2,931,168 A | * | 4/1960 | Nordwald | F02K 1/17 60/238 |
| 2,965,137 A | * | 12/1960 | Leeson | F01D 17/08 92/37 |

(Continued)

OTHER PUBLICATIONS

European Patent Office, Communication dated Feb. 3, 2020 re application No. 19196719.9.

*Primary Examiner* — Sizo B Vilakazi
*Assistant Examiner* — Brian R Kirby
(74) *Attorney, Agent, or Firm* — Norton Rose Fulbright Canada LLP

(57) ABSTRACT

A system for adjusting a variable position vane in an aircraft engine is disclosed. The system comprises a servo valve operatively connected to the variable position vane and configured to cause adjustment of the variable position vane based on a pressure of air pressurized by a compressor of the aircraft engine.

24 Claims, 12 Drawing Sheets

(56) References Cited

U.S. PATENT DOCUMENTS

| | | | | |
|---|---|---|---|---|
| 3,146,585 A * | 9/1964 | Gulick | F04D 27/0246 | 60/230 |
| 3,211,424 A * | 10/1965 | Lewakowski | F02C 9/22 | 415/32 |
| 3,254,674 A * | 6/1966 | Leask | F15B 9/10 | 137/625.23 |
| 3,417,607 A * | 12/1968 | Johnson | F01D 17/08 | 73/23.28 |
| 3,630,633 A * | 12/1971 | Stockton | F01D 17/162 | 415/10 |
| 3,799,689 A * | 3/1974 | Moriguti | F03B 3/183 | 415/26 |
| 3,917,430 A * | 11/1975 | Bloom | F01D 17/26 | 415/26 |
| 3,937,588 A * | 2/1976 | Kisslan | F02C 9/20 | 415/17 |
| 4,199,007 A * | 4/1980 | Holmes | F16K 11/06 | 137/624.13 |
| 4,252,498 A * | 2/1981 | Radcliffe | F04D 27/0246 | 415/26 |
| 4,253,603 A * | 3/1981 | Johnson | F02C 9/28 | 137/85 |
| 4,391,290 A * | 7/1983 | Williams | F01D 11/24 | 137/340 |
| 4,905,572 A * | 3/1990 | Devaud | F15B 9/10 | 137/625.22 |
| 5,090,194 A * | 2/1992 | Richards | F01D 17/26 | 137/625.23 |
| 5,216,877 A * | 6/1993 | Moore, Jr. | F04D 27/0223 | 415/27 |
| 5,224,820 A * | 7/1993 | Brichet | F01D 17/162 | 415/150 |
| 5,353,685 A | 10/1994 | Snow | | |
| 5,467,800 A * | 11/1995 | Sallas | F15B 21/125 | 137/624.13 |
| 5,671,652 A | 9/1997 | Weyer | | |
| 5,954,093 A * | 9/1999 | Leonard | F15B 13/0406 | 137/625.23 |
| 7,927,067 B2 * | 4/2011 | Rajamani | F04D 29/563 | 415/118 |
| 8,960,228 B2 * | 2/2015 | Hervieux | F15B 20/008 | 137/625.23 |
| 9,394,804 B2 * | 7/2016 | Rusovici | F01D 17/162 | |
| 9,732,624 B2 * | 8/2017 | Singh | F01D 17/162 | |
| 10,001,066 B2 * | 6/2018 | Emmet | F04D 29/563 | |
| 10,273,884 B2 * | 4/2019 | Ribarov | F04D 27/023 | |
| 10,774,672 B2 * | 9/2020 | Gould | F01D 17/20 | |
| 2004/0022624 A1 * | 2/2004 | Harrold | F01D 17/162 | 415/162 |
| 2006/0101826 A1 | 5/2006 | Martis et al. | | |
| 2010/0021285 A1 * | 1/2010 | Rowe | F04D 29/563 | 415/125 |
| 2013/0236296 A1 * | 9/2013 | Collopy | F02C 9/20 | 415/162 |
| 2013/0283762 A1 * | 10/2013 | Simpson | F16K 31/16 | 60/39.23 |
| 2014/0133968 A1 * | 5/2014 | Holchin | F16C 3/12 | 415/148 |
| 2014/0271295 A1 * | 9/2014 | Kim | F03C 2/22 | 418/1 |
| 2015/0240827 A1 * | 8/2015 | Hoemke | F04D 29/563 | 415/1 |
| 2017/0292400 A1 | 10/2017 | Bifulco | | |
| 2020/0131918 A1 * | 4/2020 | Calderon | F01D 21/06 | |

\* cited by examiner

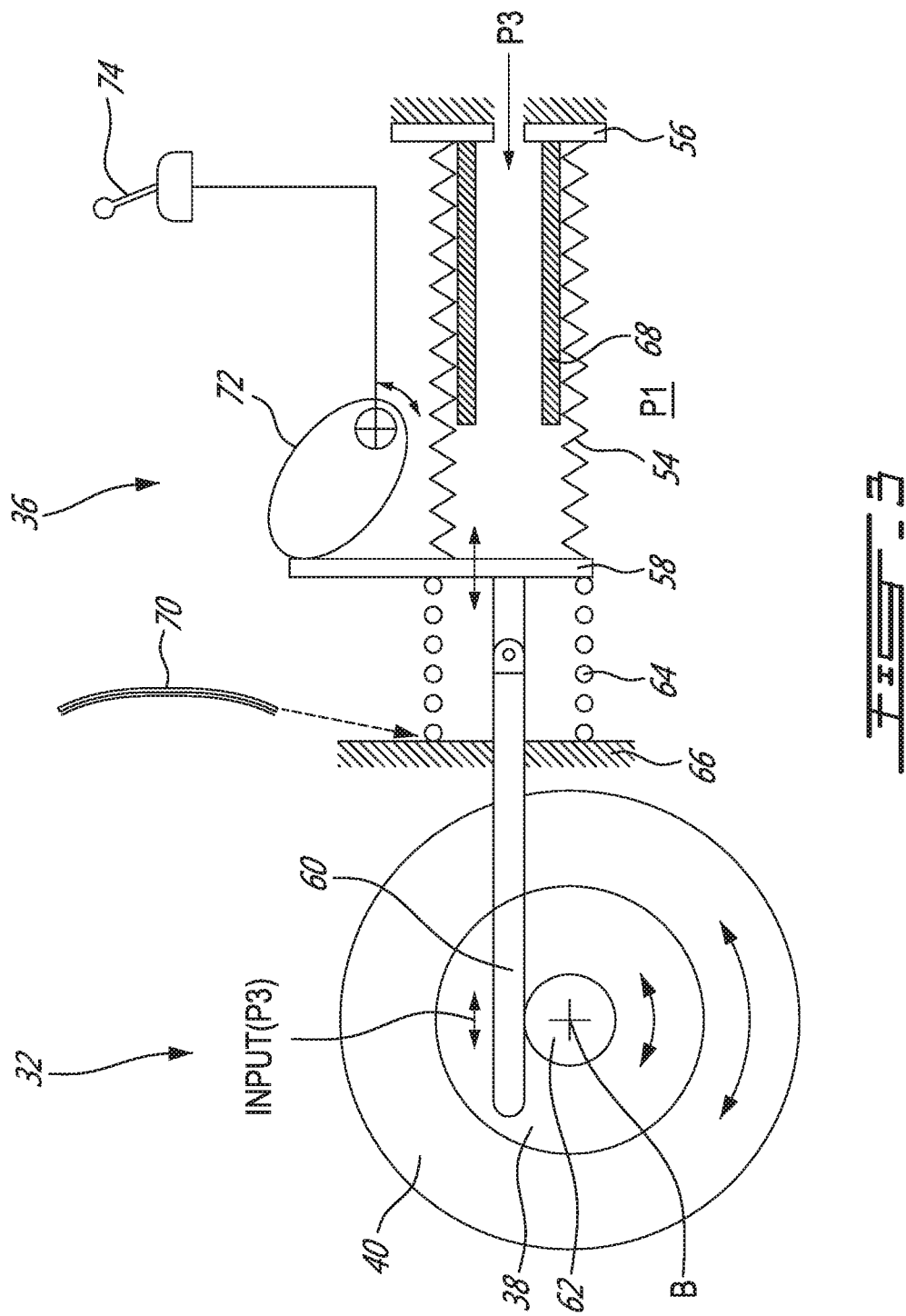

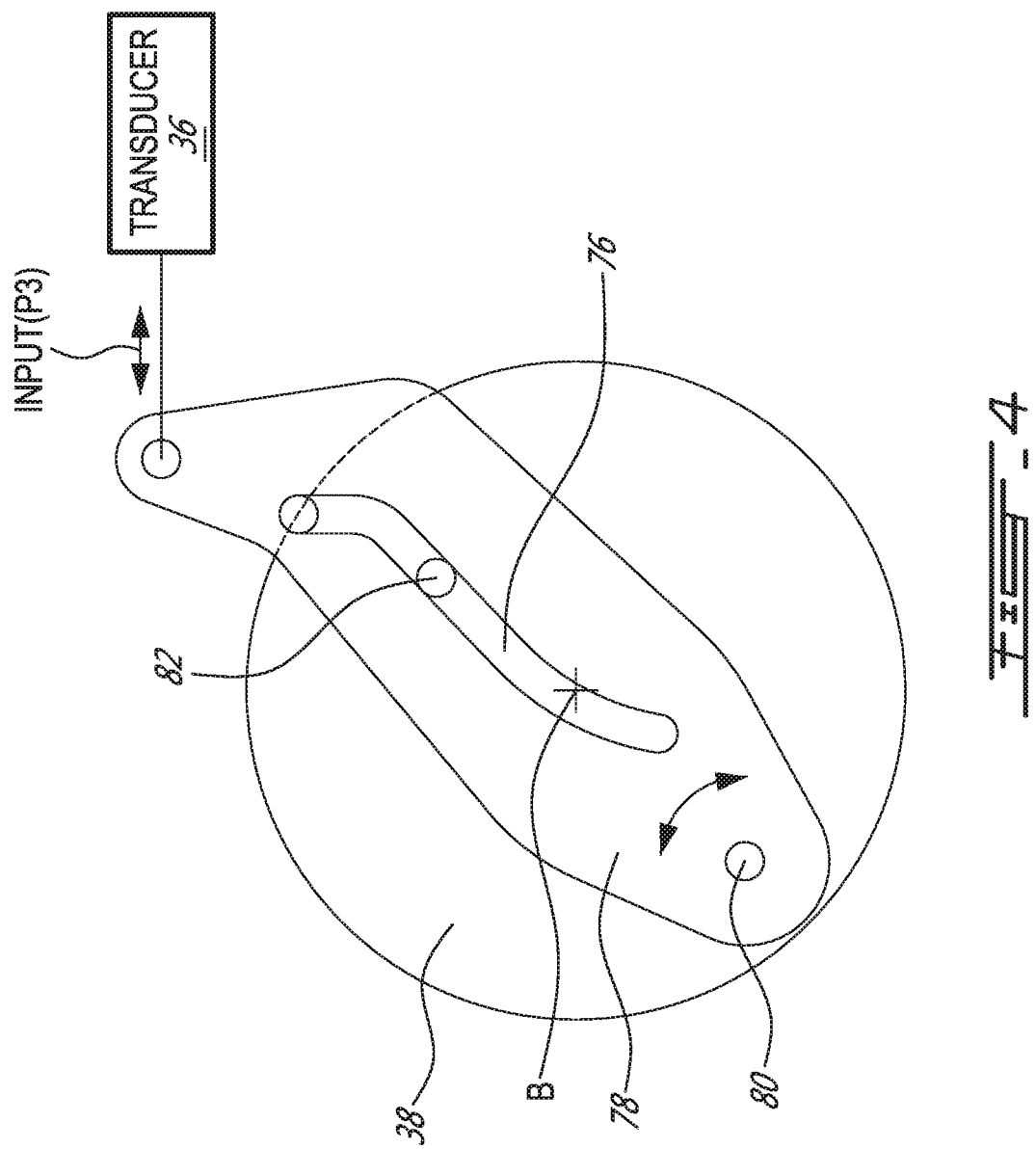

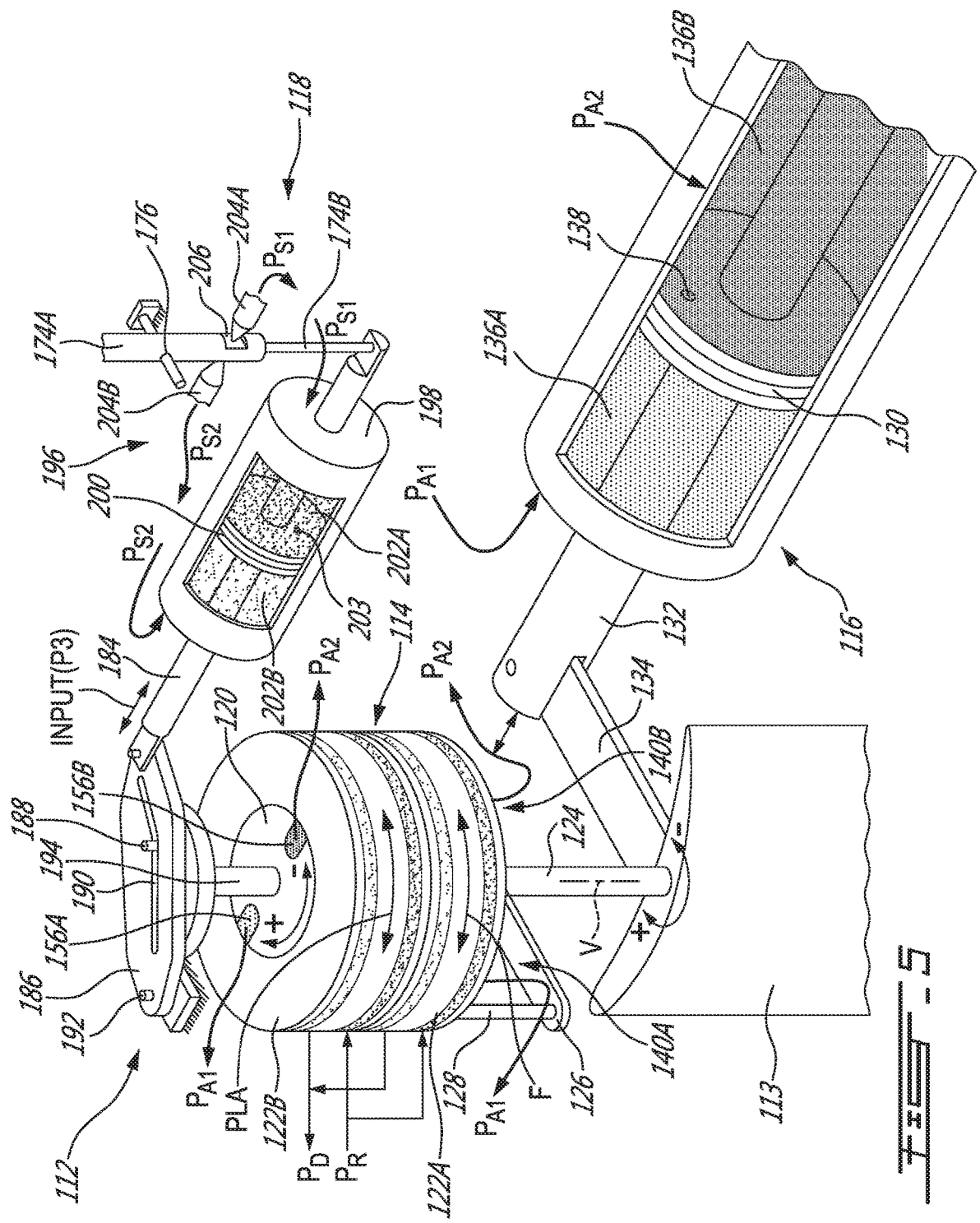

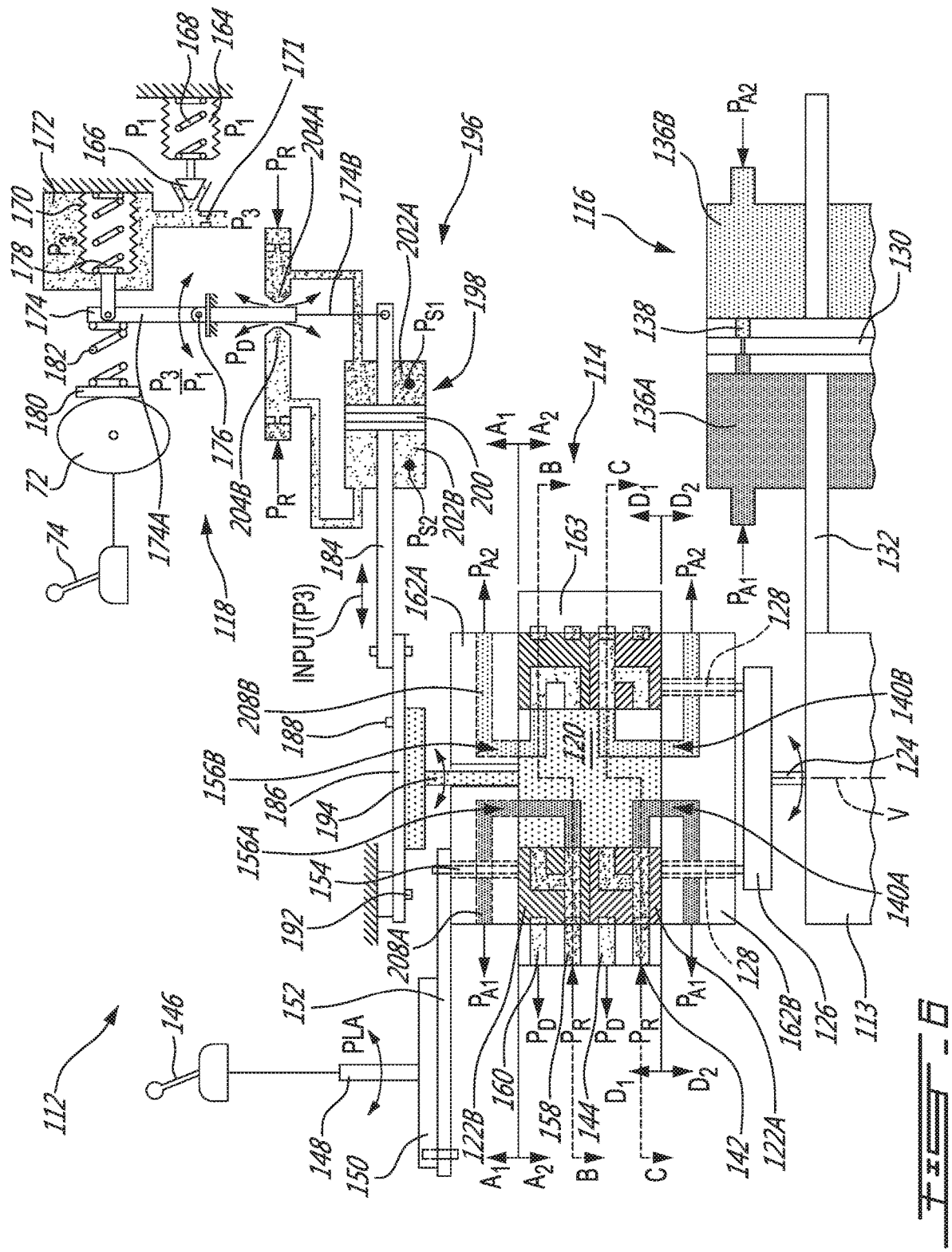

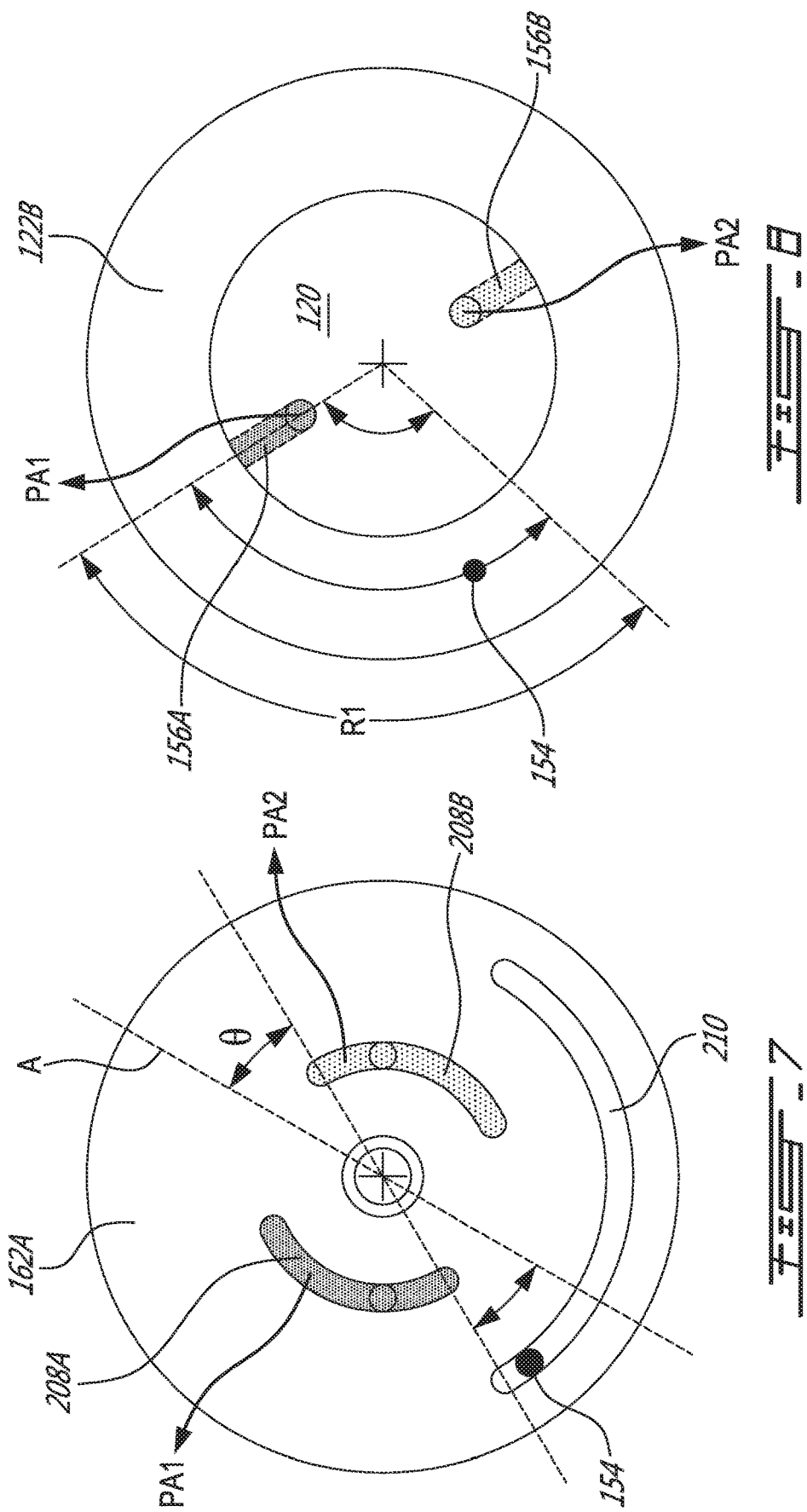

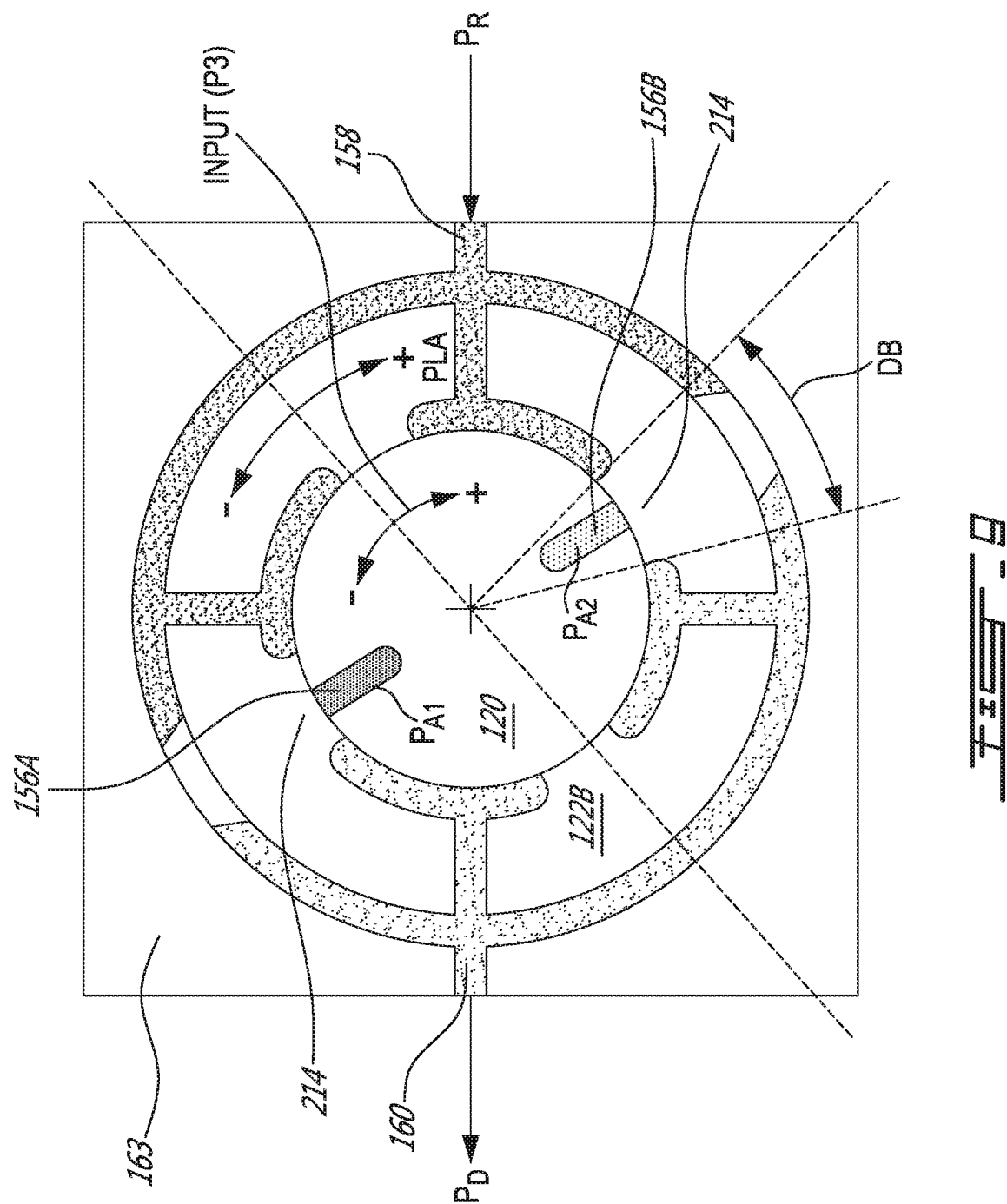

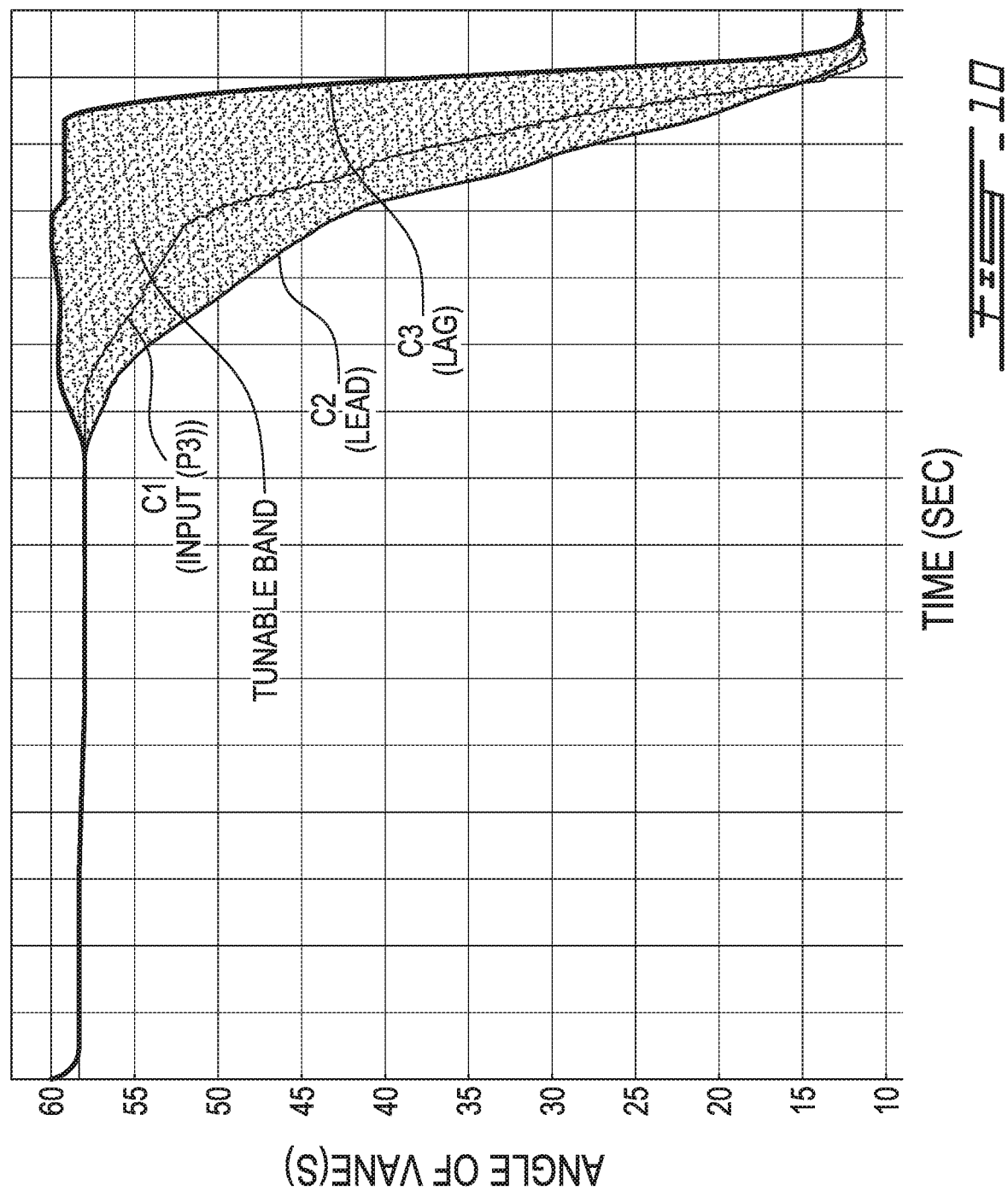

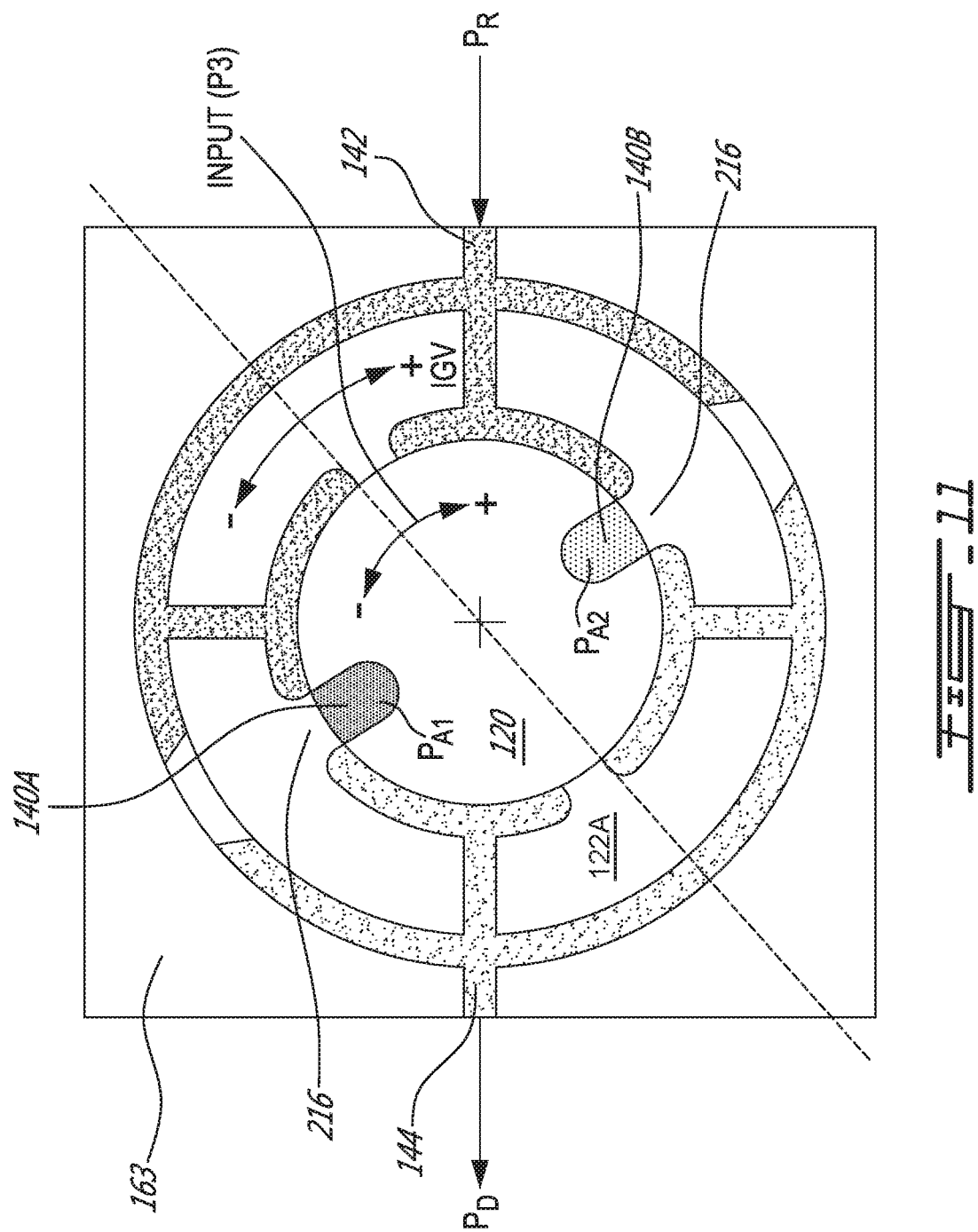

SYSTEM FOR ADJUSTING A VARIABLE POSITION VANE IN AN AIRCRAFT ENGINE

CROSS REFERENCE TO RELATED APPLICATION AND CLAIM OF PRIORITY

The present application claims priority to U.S. provisional patent application No. 62/729,517 filed on Sep. 11, 2018, the entire contents of which are hereby incorporated by reference.

TECHNICAL FIELD

The disclosure relates generally to aircraft engines having compressors, and more particularly to adjusting variable position vanes of such compressors.

BACKGROUND

Variable inlet guide vanes can help guide the inlet air flow to a compressor, such as those found in today's gas turbine engines in order to improve engine performance. Some of today's gas turbine engines that do not have variable inlet guide vanes could benefit from the addition of such variable inlet guide vanes but retrofitting such engines to have variable inlet guide vanes may be complex and costly.

SUMMARY

In one aspect, the disclosure describes a system for adjusting a variable position vane in an aircraft engine. The system comprises:
a fluid-actuated actuator operatively connected to cause positional adjustment of the variable position vane;
a servo valve including a valve member cooperating with a spool to control a flow of fluid to the fluid-actuated actuator, the servo valve configured to control the flow of fluid to the fluid-actuated actuator based on an input indicative of a pressure of air pressurized by a compressor of the aircraft engine and positional feedback from the variable position vane; and
a transducer configured to generate the input to the servo valve based on a received signal indicative of the pressure of the air pressurized by the compressor of the aircraft engine.

In another aspect, the disclosure describes an aircraft engine comprising:
an inlet for receiving a flow of air into the aircraft engine;
a variable position vane for guiding the flow of air;
a compressor for pressuring the air; and
a rotary servo valve operatively connected to the variable position vane and configured to cause adjustment of the variable position vane based on a pressure of the air pressurized by the compressor.

Further details of these and other aspects of the subject matter of this application will be apparent from the detailed description included below and the drawings.

DESCRIPTION OF THE DRAWINGS

Reference is now made to the accompanying drawings, in which:

FIG. 3 is a schematic representation showing an exemplary transducer of the system of FIG. 2 operatively connected to a rack-and-pinion arrangement;

FIG. 4 is a schematic representation showing an exemplary cam arrangement for operatively connecting with the transducer of FIG. 3;

FIG. 5 is a schematic perspective representation of part of another exemplary system for adjusting the one or more variable position vanes;

FIG. 6 is a schematic representation of part of the system of FIG. 5;

FIG. 7 is a cross-sectional view of a rotary servo valve of the system of FIG. 6 taken along line A1-A1 in FIG. 6;

FIG. 8 is a cross-sectional view of the rotary servo valve of the system of FIG. 6 taken along line A2-A2 in FIG. 6;

FIG. 9 is a cross-sectional view of the rotary servo valve of the system of FIG. 6 taken along line B-B in FIG. 6;

FIG. 10 shows plots of the angular position of the one or more variable position vanes as a function of time indicating lead- and lag-type behavior of the system of FIG. 6;

FIG. 11 is a cross-sectional view of the rotary servo valve of the system of FIG. 6 taken along line C-C in FIG. 6;

DETAILED DESCRIPTION

The following description relates to systems and methods for controlling variable (e.g., inlet guide) vanes in aircraft engines, such as gas turbine engines or other suitable air-breathing aircraft engines. The systems and methods disclosed herein may be used in engines that have variable position vanes and may be used to facilitate the addition of variable position vanes to gas turbine engines by retrofitting. In some embodiments, the systems described herein may be hydro-mechanical and require little to no additions or modifications to existing controls and software onboard the gas turbine engine being retrofitted. For example, the systems described herein may be configured to cause automatic adjustment of variable position vanes as a function of the engine's compressor discharge pressure (P3) using one or more (e.g., linear or rotary) servo valves.

Aspects of various embodiments are described through reference to the drawings.

Figure 1:
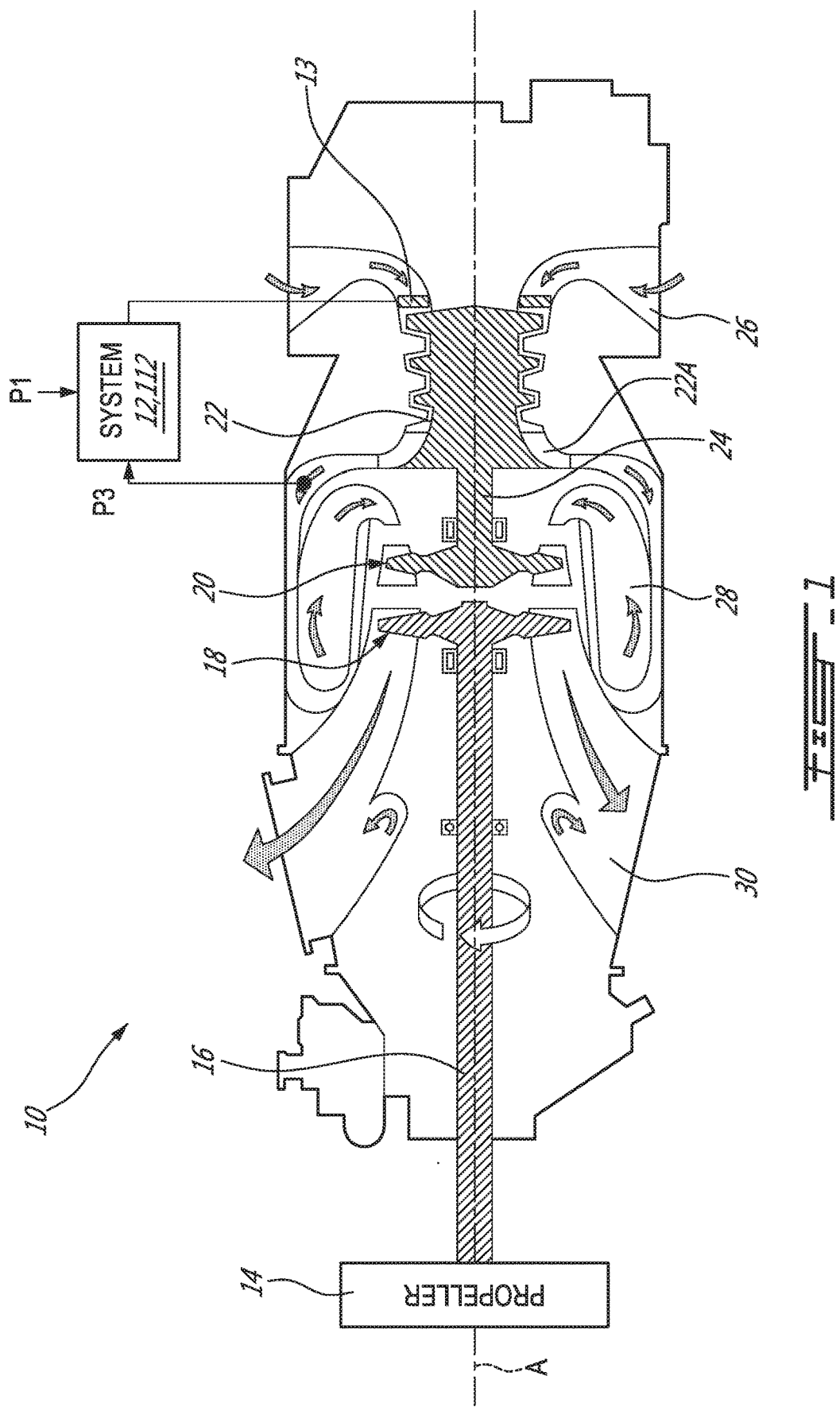
FIG. 1 is a schematic axial cross-section view of an exemplary gas turbine engine including a system for adjusting one or more variable position vanes.

FIG. 1 is a schematic axial cross-section view of an exemplary reverse flow turboprop or turboshaft gas turbine engine 10 comprising an exemplary system 12 for adjusting one or more variable position vanes 13 as described herein. Even though the following description and accompanying drawings specifically refer to a turboprop gas turbine engine as an example, it is understood that aspects of the present disclosure may be equally applicable to other types of gas turbine engines. In various embodiments, vanes 13 and system 12 can be retrofitted into an existing engine that does not include vanes 13. Alternatively, vanes 13 and system 12 can be originally installed in gas turbine engine 10. Gas turbine engine 10 may be of a type preferably provided for use in subsonic flight to drive a load such as propeller 14 via low-pressure shaft 16, sometimes called "power turbine shaft", driven by low-pressure turbine 18. Low-pressure turbine 18 and low-pressure shaft 16 may be part of a first spool of gas turbine engine 10 known as a low-pressure spool. Gas turbine engine 10 may include a second or high-pressure spool including high-pressure turbine 20, (e.g., multistage) compressor 22 and high pressure shaft 24.

Compressor 22 may draw ambient air into engine 10 via annular radial air inlet duct 26, increase the pressure of the drawn air and deliver the pressurized air to combustor 28 where the pressurized air is mixed with fuel and ignited for generating an annular stream of hot combustion gas. High-pressure turbine 20 may extract energy from the hot expanding combustion gas and thereby drive compressor 22. The hot combustion gas leaving high-pressure turbine 20 may be accelerated as it further expands, flows through and drives low pressure turbine 18. The combustion gas may then exit gas turbine engine 10 via exhaust duct 30. The exemplary configuration of gas turbine engine 10 shown in FIG. 1 may be referred to as a reverse-flow free turbine engine in relation to the general flow direction in the gas path during operation of gas turbine engine 10.

Air inlet duct 26 may have a generally annular shape and be of the "radial" type where it may be configured to receive a flow of ambient air along a generally radially-inward direction relative to axis A of gas turbine engine 10 and direct the air toward a substantially axial direction relative to axis A. In some embodiments, axis A may substantially correspond to a central axis of gas turbine engine 10. In some embodiments, axis A may substantially correspond to an axis of rotation of compressor 22.

In some embodiments, vanes 13 may be arranged in a circumferential array (e.g., vane ring) and be disposed upstream of compressor 22. Vanes 13 of such vane ring can, for example, be controllably adjusted in unison for guiding the flow of air entering gas turbine engine 10 based on the operating condition of gas turbine engine 10. For example, vanes 13 may be variable inlet guide vanes (sometimes called "intake guide vanes") and may be located upstream of a first stage of compressor 22. Alternatively or in addition, vanes 13 may be located in a subsequent stage of compressor 22. Vanes 13 may be used to direct the incoming air onto compressor 22 at a desired angle to meet the requirements of the operating conditions of gas turbine engine 10.

Some gas turbine engines 10 are originally designed and manufactured to have vanes 13 but some gas turbine engines 10 that did not originally come with vanes 13 could still benefit from the addition of vanes 13 by retrofitting. System 12 as described herein may facilitate the installation or retrofitting of vanes 13 without requiring complex control/software changes since systems 12, 112 may be of a hydro-mechanical type. As explained further below, systems 12 or 112 may be operatively connected to vanes 13 and operatively connected to receive an input indicative of a pressure (e.g., P3) of the air pressurized by compressor 22. In some embodiments, pressure P3 may be a highest pressure of pressurized air available on gas turbine engine 10. For example, pressure P3 may represent a pressure of compressed air located immediately downstream of a high-pressure (e.g., centrifugal/radial) compressor 22A of gas turbine engine 10. System 12 may be configured to control the angular position of vanes 13 as a function of pressure P3. For example, systems 12 or 112 may be configured to control the angular position of vanes 13 based on a value of P3 relative to an ambient pressure P1 (e.g., P3-P1 or P3/P1).

Figure 2:
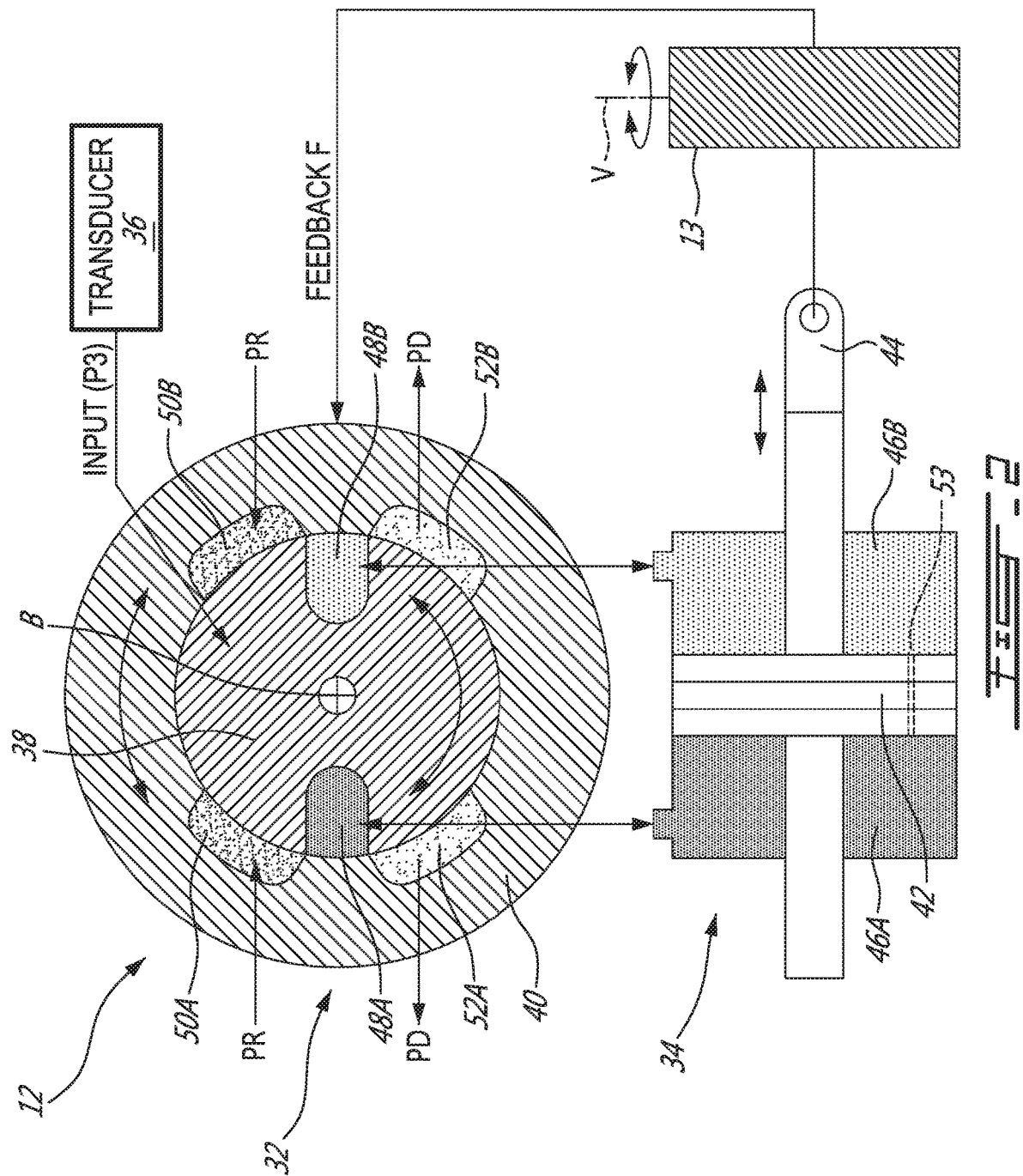
FIG. 2 is a schematic representation of part of an exemplary system for adjusting the one or more variable position vanes.

FIG. 2 is a schematic representation of part of an exemplary system 12 for adjusting the one or more vanes 13 of FIG. 1. FIG. 2 shows a single vane 13 that is (e.g., angularly) adjustable by some angular amount about axis V. It is understood that system 12 may also be used to control a plurality of vanes 13 arranged in a vane ring and adjustable in unison for example. System 12 may include (e.g., rotary) servo valve 32 operatively connected to vane 13 and causing positional adjustment of vane 13 based on a pressure P3 of the air pressurized by the compressor 22. Servo valve 32 may be operatively connected to vane 13 via actuator 34. Servo valve 32 may receive an input related to pressure P3 from transducer 36.

Servo valve 32 may include valve member 38 cooperating with spool 40 to control a flow of fluid to fluid-actuated actuator 34. Servo valve 32 may control the flow of (e.g., hydraulic) fluid to fluid-actuated actuator 34 based on the input related to pressure P3 and positional feedback F from vane 13. Actuator 34 may be a double-acting linear actuator configured to cause positional adjustment of vane 13 in a first or in a second opposite direction. Actuator 34 may include piston 42 for actuation of rod 44. Actuator 34 may be mechanically connected to vane 13 via rod 44. Actuator 34 may include first chamber 46A and second chamber 46B disposed on opposite sides of piston 42 for causing actuation of piston 42 by controlling the pressure and flow of fluid into and out of chambers 46A, 46B.

Servo valve 32 may include first actuation port 48A in fluid communication with first chamber 46A of actuator 34, and second actuation port 48B in fluid communication with second chamber 46B of actuator 34. In some embodiments, first actuation port 48A and second actuation port 48B may be formed in valve member 38. Servo valve 32 may also include first and second pressure ports 50A, 50B in fluid communication with a source of pressurized fluid. In various embodiments, such pressurized fluid may be pressurized air, hydraulic fluid, engine oil provided from an oil system/pump of engine 10 or fuel provided from a fuel system/pump of engine 10. First and second pressure ports 50A, 50B may be formed in spool 40. Servo valve 32 may also include first and second discharge ports 52A, 52B in fluid communication with a discharge reservoir that is at a lower pressure than the pressurized fluid available via first and second pressure ports 50A, 50B. In various embodiments, first and second discharge ports 52A, 52B may be in fluid communication with an oil drain/scavenging line of the oil system or a return line of the fuel system for example. First and second discharge ports 52A, 52B may be formed in spool 40.

FIG. 2 shows servo valve 32 in a null (i.e., equilibrium) configuration where actuation ports 48A, 48B, pressure ports 50A, 50B and discharge ports 52A, 52B are all closed so that little or no fluid is permitted in or out of actuator 34 and consequently vane 13 is held in its current position. Valve member 38 and spool 40 may be separately rotatable about a common axis B. Relative rotation between valve member 38 and spool 40 may cause servo valve 32 to move away from the null configuration so that fluid may be sent to and received from actuator 34 for the purpose of adjusting the angular position of vane 13. Rotation of valve member 38 about axis B may be achieved via the input related to pressure P3 (INPUT(P3)), which may command an associated angular position of valve member 38 based on pressure P3. In other words, INPUT(P3) may include a positional setting of valve member 38. Valve member 38 may be operatively connected to transducer 36 via suitable mechanical linkage/mechanism. Rotation of spool 40 about axis B may be achieved via feedback F related to the current angular position of vane 13. In other words, the feedback F may include a positional setting of spool 40. Spool 40 may be operatively connected to vane 13 via suitable mechanical linkage/mechanism.

In reference to FIG. 2, some clockwise rotation of valve member 38 relative to spool 40 (e.g., due to a change in pressure P3) would cause first actuation port 48A to become in fluid communication with first pressure port 50A and would cause second actuation port 48B to become in fluid communication with second discharge port 52B. Such configuration of servo valve 32 would then cause fluid to be supplied from first pressure port 50A to first chamber 46A of actuator 34 via first actuation port 48A while allowing fluid to be discharged from second chamber 46B of actuator 34 to second discharge port 52B via second actuation port 48B to thereby cause movement of piston 42 toward the right hand side of FIG. 2 and cause corresponding adjustment of vane 13. Alternatively, some counter-clockwise rotation of valve member 38 relative to spool 40 (e.g., due to a change in pressure P3) would cause second actuation port 48B to become in fluid communication with second pressure port 50B and would cause first actuation port 48A to become in fluid communication with first discharge port 52A. Such configuration of servo valve 32 would then cause fluid to be supplied from second pressure port 50B to second chamber 46B of actuator 34 via second actuation port 48B while allowing fluid to be discharged from first chamber 46A of actuator 34 to first discharge port 52A via first actuation port 48A to thereby cause movement of piston 42 toward the left hand side of FIG. 2 and cause corresponding adjustment of vane 13.

It is understood that analogous operation of servo valve 32 would apply for rotation of spool 40 relative to valve member 38 due to positional feedback F from vane 13. Accordingly, following a positional adjustment of vane 13 in response to a rotational movement of valve member 38 due to a change in pressure P3 for example, feedback F received by spool 40 would cause rotational movement of spool 40 relative to valve member 38 back toward a null (i.e., equilibrium) configuration of servo valve 32 as shown in FIG. 2 so that once the desired positional adjustment of vane 13 has been achieved, the associated rotational movement of spool 40 would cause the further adjustment of vane 13 to stop automatically. Accordingly, servo valve 32 may operate in a self-adjusting manner and be configured to provide a desired scheduling of the position of vane 13 based on pressure P3.

In some embodiments, a relatively small orifice 53 may be provided through piston 42 to establish some fluid communication between first chamber 46A and second chamber 46B to permit a relatively small amount of fluid circulation and maintain a relatively fresh supply of fluid being used in system 12. Accordingly, in some embodiments, the null configuration of servo valve 32 could cause a relatively small amount of fluid to be provided/discharged to/from actuator 34 due to the presence of orifice 53.

FIG. 3 is a schematic representation showing an exemplary transducer 36 of system 12 operatively connected to servo valve 32 via a rack-and-pinion arrangement. Transducer 36 may be configured to provide a linear position (e.g., see INPUT(P3)) based on a signal indicative of pressure P3. For example, transducer 36 may be configured to convert a pressure differential between pressure P3 and an ambient pressure P1 (e.g., P3−P1) to the corresponding linear position. Ambient pressure P1 may be lower than pressure P3 during operation of gas turbine engine 10. In some embodiments, ambient pressure P1 may be a pressure at a location of transducer 36. In some embodiments, ambient pressure P1 may be a pressure outside of the gas path of gas turbine engine 10. In some embodiments, ambient pressure P1 may be substantially equivalent to an atmospheric pressure at the altitude of gas turbine engine 10 and may vary based on altitude.

The use of transducer 36 may be suitable for ground-based engine applications or aircraft applications that do not undergo significant variations in altitude. In embodiments where significant changes in altitude are expected, it may be desirable that system 12 of FIG. 2 be used with a transducer that takes into consideration the variations in ambient pressure P1 associated with such variations in altitude. Transducer 36 could be modified to include such compensating function by, for example, including elements of transducer 118 (e.g., P1 bellows 164, venting valve 166 and P1 spring) illustrated in FIG. 6. Alternatively, transducer 36 of system 12 of FIG. 2 could be replaced with transducer 118 in order to incorporate such compensation for variations in ambient pressure P1. Accordingly, INPUT(P3) could be based on a compensated pressure P3' that is adjusted as a function of (e.g., proportionately to) the altitude reflected by the value of ambient pressure P1.

In some embodiments, transducer 36 may include bellows 54 that is configured to provide a linear position (e.g., see INPUT(P3)) as a function of a pressure differential between pressure P3 and ambient pressure P1. For example, an interior of bellows 54 may be exposed to pressure P3 of the air pressurized by compressor 22, and an exterior of bellows 54 may be exposed to ambient pressure P1. Alternatively, the interior of bellows 54 may be exposed to compensated pressure P3' adjusted as a function of altitude as explained above. Bellows 54 may be disposed between first support 56 and movable member 58 so that expansion and contraction of bellows 54 due to different magnitudes of pressures P1 and P3 may cause linear movement of movable member 58. The linear movement of movable member 58 may be transmitted to valve member 38 via rack 60 and pinion gear 62. Pinion gear 62 may be coupled for common rotation with valve member 38. Rack 60 and pinion gear 62 may be toothed to provide suitable meshing engagement and suitable conversion of the linear movement of rack 60 (and of movable member 58) into an angular positional setting of valve member 38.

Bellows 54 may be disposed on a first side of movable member 58 so that the expansion of bellows 54 causes corresponding movement of movable member 58 in the opposite direction. In reference to FIG. 3 for example, bellows 54 may be disposed to the right side of movable member 58 so that expansion of bellows 54 urges movable member 58 toward the right. In some embodiments, biasing member 64 may be disposed on a side of movable member 58 opposite bellows 54. In reference to FIG. 3 for example, biasing member 64 may urge movable member 58 toward the right while the expansion of bellows 54 would urge movable member 58 toward the left. Biasing member 64 may be a suitable spring disposed between second support 66 and movable member 58. In some embodiments, biasing member 64 may be a coil spring where rack 60 extends into or is otherwise interconnected with movable member 58 via a central opening of the coil spring. It is understood that various elements of transducer 36, rack 60 and pinion gear 62 may be selected to provide a suitable conversion of the pressure differential between pressures P3 and P1 into an angular positional setting of valve member 38. In some embodiments, transducer 36 may include on or more stoppers 68 (e.g., hard stops) to provide one or more corresponding limits of movement of movable member 58.

In some embodiments, transducer 36 may be configured to take into account ambient temperature T1 when providing INPUT(P3) to valve member 38. In some embodiments, suitable compensation for temperature T1 may be provided by way of an optional temperature-sensitive element 70 configured to preload biasing member 64 as a function of temperature. For example, temperature-sensitive element 70 may include one or more bi-metallic discs operatively disposed between biasing member 64 and second support 66. In some embodiments, temperature-sensitive element 70 may include a volume of fluid that is sensitive to temperature variations.

In some embodiments, transducer 36 may include a manual override feature than may permit an operator of engine 10 such as a pilot of an aircraft to which engine 10 is mounted, to manually adjust vanes 13 via servo valve 32 by bypassing an input that would otherwise be provided by bellows 54. In one embodiment, such override feature may include override cam 72 configured to engage with movable member 58 and provide manual positional adjustment of movable member 58. Override cam 72 may be operatively connected to be controllable via override lever 74, which may be disposed in a cockpit of the aircraft for example. In reference to FIG. 3, rotation of override cam 72 may urge movable member 58 toward the left and also permit biasing member 64 to urge movable member 58 toward the right by a desired amount depending on the direction of rotation of override cam 72. Override lever 74 may be provided on single-engine aircraft and could be used to manually control the flow of fuel to engine 10 in case of a failure of a power (i.e., thrust) lever of the aircraft.

FIG. 4 is a schematic representation showing an exemplary cam arrangement for operatively connecting transducer 36 with valve member 38. The cam arrangement of FIG. 4 may be used instead of the rack and pinion arrangement of FIG. 3 where more complex (e.g., non-linear) scheduling may be required between the linear movement (e.g., INPUT(P3)) provided by transducer 36 and valve member 38. The cam arrangement may include cam slot 76 formed in cam plate 78 which may be pivotally connected via pivot pin 80 to some (e.g., fixed) structure other than valve member 38. Cam slot 76 may be engaged with pin 82 which may be secured to valve member 38 so that as cam plate 78 is caused to rotate by transducer 36, the engagement of pin 82 with cam slot 76 causes valve member 38 to rotate according to the selected profile of cam slot 76 to achieve the desired scheduling and positional adjustment of vanes 13.

FIGS. 5 and 6 are schematic representations of part of another exemplary system 112 for adjusting one or more vanes 113 of gas turbine engine 10. FIGS. 5 and 6 show a single vane 113 that is (e.g., angularly) adjustable by some angular amount about axis V. Elements of system 112 may be integrated with elements of system 12 described above and vice versa. It is understood that system 112 may also be used to control a plurality of vanes 113 arranged in a vane ring and adjustable in unison for example. System 112 may include (e.g., rotary) servo valve 114 operatively connected to vane 113 and configured to cause positional adjustment of vane 113 based on pressure P3 of the air pressurized by compressor 22 of engine 10. Servo valve 114 may be operatively connected to vane 113 via actuator 116. Servo valve 114 may receive an input related to pressure P3 (e.g., INPUT(P3)) from transducer 118.

Servo valve 114 may include central valve member 120 cooperating with vane spool 122A to control a flow of fluid to fluid-actuated actuator 116. Servo valve 114 may control the flow of fluid to fluid-actuated actuator 116 based on INPUT(P3) and positional feedback F from vane 113. Positional feedback F may be in the form of angular displacement of vane spool 122A. Positional feedback F may be transmitted from vane 113 to vane spool 122A via mechanical coupling between vane 113 and vane spool 122A. Such mechanical coupling may be provided by shaft 124, link 126 and pins 128 for example. The angular position of shaft 124 may be representative of the angular position of vane 113. For example, shaft 124 may be secured to vane 113 for common rotation with vane 113. In some embodiments, pins 128, link 126 and shaft 124 may rotate together about axis V. Pins 128 may be secured to vane spool 122A so that rotation of vane 113 may be transmitted to vane spool 122A.

In some embodiments, actuator 116 may be of the same type as actuator 34 described above. Actuator 116 may be a double-acting linear actuator configured to cause positional (e.g., angular) adjustment of vane 113 in a first or in a second opposite direction. Actuator 116 may include piston 130 for actuating rod 132. Actuator 116 may be mechanically connected to cause positional adjustment of vane 113 via rod 132 and link 134. Actuator 116 may include first chamber 136A and second chamber 136B disposed on opposite sides of piston 130 for causing actuation of piston 130 by controlling the flow of (e.g., hydraulic) fluid into and out of chambers 136A, 136B. In some embodiments, a relatively small orifice 138 may be provided through piston 130 to establish some fluid communication between first chamber 136A and second chamber 136B to permit a relatively small amount of fluid circulation and maintain a relatively fresh supply of fluid being used in system 112. Accordingly, in some embodiments, the null configuration of servo valve 114 could cause a relatively small amount of fluid to be provided/discharged to/from actuator 116 due to the presence of orifice 138.

Servo valve 114 may include actuation port 140A at pressure PA1 in fluid communication with first chamber 136A of actuator 116, and actuation port 140B at pressure PA2 in fluid communication with second chamber 136B of actuator 116. In some embodiments, actuation port 140A and actuation port 140B (shown in FIG. 12) may be formed in valve member 120. Servo valve 114 may also include first pressure port 142 (shown in FIG. 6) in fluid communication with a source of pressurized fluid at pressure PR. In various embodiments, such pressurized fluid may be pressurized air, hydraulic fluid, engine oil provided from an oil system/pump of engine 10 or fuel provided from a fuel system/pump of engine 10. First pressure port 142 may be formed in vane spool 122A. Servo valve 114 may also include first discharge port 144 (shown in FIG. 6) in fluid communication with a discharge reservoir that is at a lower pressure (e.g., PD) than the pressurized fluid available via first pressure port 142. In various embodiments, first discharge port 144 may be in fluid communication with an oil drain/scavenging line of the oil system or a return line of the fuel system for example. First discharge port 144 may be formed in vane spool 122A.

Servo valve 114 may include two rotatable spools (e.g., vane spool 122A and PLA spool 122B) that are operatively arranged with a common valve member 120. Vane spool 122A and PLA spool 122B may be separately rotatable from each other. Spools 122A, 122B may also be separately rotatable from valve member 120. As explained above, vane spool 122A may be operatively coupled to vane 113 so that the angular position of vane spool 122A may be representative of the angular position of vane 113. On the other hand, PLA spool 122B may be operatively coupled to power (or thrust) lever 146 associated with engine 10. Power lever 146 may be located in a cockpit of an aircraft to which engine 10 is mounted for example. Accordingly, the angular position of PLA spool 122B may be representative of a position, such as a power lever angle (PLA), of adjustable power lever 146. For example, PLA spool 122B may be operatively coupled to power lever 146 via rotatable shaft 148, crank 150 connected to and rotatable with shaft 148, link 152 pivotally connected to crank and pin 154 connected to link 152. Consequently, servo valve 114 may receive a first input INPUT(P3) from transducer 118 via rotation of valve member 120 and a second input indicative of the power lever angle PLA from power lever 146 via rotation of PLA spool 122B relative to valve member 120. As explained further below, the use of the second input indicative of PLA may be used to provide a lead- or lag-type behaviour of the adjustment of vane 113 by servo valve 114 as a function of the actuation of power lever 146.

Servo valve 114 may include actuation port 156A at pressure PA1 in fluid communication with first chamber 136A of actuator 116, and actuation port 156B at pressure PA2 in fluid communication with second chamber 136B of actuator 116. In some embodiments, actuation port 156A and actuation port 156B may be formed in valve member 120. Servo valve 114 may also include second pressure port 158 (shown in FIG. 6) in fluid communication with a source of pressurized fluid at pressure PR. In various embodiments, such pressurized fluid may be pressurized air, hydraulic fluid, engine oil provided from an oil system/pump of engine 10 or fuel provided from a fuel system/pump of engine 10. Second pressure port 158 may be formed in PLA spool 122B. Servo valve 114 may also include second discharge port 160 (shown in FIG. 6) in fluid communication with a discharge reservoir that is at a lower pressure (e.g., PD) than the pressurized fluid available via second pressure port 158. In various embodiments, second discharge port 160 may be in fluid communication with an oil drain/scavenging line of the oil system or a return line of the fuel system for example. Second discharge port 160 may be formed in PLA spool 122B.

FIG. 6 shows servo valve 114 having first cover 162A, second cover 162B, and outer housing 163 that may be part of servo valve 114. FIG. 5 shows servo valve 114 without first cover 162A, second cover 162B and housing 163 for the purpose of illustrating valve member 120 and spools 122A and 122B in a perspective view.

FIGS. 5 and 6 also illustrate transducer 118 that is configured to provide INPUT(P3) to valve member 120. In the embodiment shown, INPUT(P3) may be indicative of a ratio of the compressor discharge pressure P3 to the ambient pressure P1 (e.g., P3/P1). In some embodiments, transducer 118 may be configured as a servo valve. The configuration of P1 bellows 164 and P3 bellows 170 may allow for INPUT(P3) to be compensated for altitude changes associated with engine 10. For example, since ambient pressure P1 may be more sensitive to altitude changes than compressor discharge pressure P3, the arrangement of P1 bellows 164 and P3 bellows 170 may be configured to provide INPUT (P3) that is based on compensated pressure P3' that is adjusted as a function of (e.g., proportionately to) the altitude reflected by the value of ambient pressure P1.

In some situations, both ambient pressure P1 and pressure P3 may change proportionally with altitude. Pressure P3 may be mostly a multiple of ambient pressure P1 that is dependent on the operating speed of compressor 22 (shown in FIG. 1). For example, ambient pressure P1 on the ground may be around 14.7 PSIA (101.4 kPa) and compressor 22 operating to provide a 10:1 compression ratio would produce a pressure P3 of about 147 PSIA (1014 kPa). The same compressor 22 operating at the same 10:1 compression ratio at an altitude with an ambient pressure of 4.7 PSIA (32.4 kPa) would produce a pressure P3 of about 47 PSIA (324 kPa). The use of P1 bellows 164 may therefore allow P3 bellows 170 to be exposed to the same compensated pressure P3' for a given compressor operating pressure ratio regardless of the ambient pressure P1 (altitude). Orifice 171 may be operatively disposed upstream of venting valve 166 in order to produce a pressure drop from pressure P3 to pressure P3' due to the action of venting valve 166.

The exterior of P1 bellows 164 may be exposed to the ambient pressure P1 that may vary with altitude. The interior of P1 bellows 164 may be evacuated and sealed to have a vacuum condition inside of P1 bellows 164 relative to the outside of P1 bellows 164. Accordingly, the interior of P1 bellows 164 may be at a lower pressure than ambient pressures P1 that are within the operating envelope of engine 10. P1 bellows 164 may be operatively connected to venting valve 166 to control the actuation (e.g., opening and closing) of venting valve 166 as a function of ambient pressure P1. P1 bellows 164 may have P1 spring 168 disposed therein or integrated into the wall(s) of P1 bellows 164 to bias venting valve 166 toward the closed position of venting valve 166. P1 spring 168 may be a coil spring and may be calibrated so that venting valve 166 is at a first open position when ambient pressure P1 is substantially at standard sea-level pressure (i.e., one atmosphere or 101.3 kPa) for example. As altitude is increased, and ambient pressure P1 is decreased, the reduced ambient pressure P1 on the exterior of bellows 164 may reduce the force opposing P1 spring 168 and cause movement of venting valve 166 toward its closed position. The amount/degree of venting provided by venting valve 166 may be a function of the magnitude of ambient pressure P1 and consequently of altitude. On the ground, the higher ambient pressure P1 may result in venting valve 166 being more widely open, more venting flow out of chamber 172 and therefore a lower value of compensated pressure P3' relative to pressure P3. At altitude, the lower ambient pressure P1 may result in venting valve 166 being less widely open, less venting flow out of chamber 172 and therefore a higher value of compensated pressure P3' relative to pressure P3. The altitude compensation provided by venting valve 166 and P1 bellows may result in substantially the same absolute compensated pressure P3' on the ground and at altitude for a given compressor operating speed. The opening of venting valve 166 may produce a pressure drop in pressure P3 resulting in compensated pressure P3' where the pressure drop may be a function of (e.g., proportional to) the amount of the opening of venting valve 166.

P3 bellows 170 may be disposed inside of chamber 172 that is in fluid communication with a source of compressed air at pressure P3. The interior of P3 bellows 170 may be evacuated so as to have a vacuum condition inside of P3 bellows 170. In some embodiments, the pressure inside of P3 bellows 170 may be lower than expected values of pressure P3 within the operating envelope of engine 10. In some embodiments, the pressure inside of P3 bellows 170 may be lower than expected values of ambient pressures P1 within the operating envelope of engine 10. P3 bellows 170 may be operatively connected to movable member 174 which may be pivotable about fulcrum 176. P3 bellows 170 may have P3 spring 178 disposed therein or integrated into the wall(s) of P3 bellows 170 to bias movable member 174 toward a desired angular position thereof about fulcrum 176. P3 spring 178 may be a coil spring disposed inside of P3 bellows 170. Alternatively, P3 spring 178 may be integrated into a wall of P3 bellows.

During operation, the angular position of movable member 174 about fulcrum 176 may be related to INPUT(P3) that is transferred to valve member 120 for the purpose of adjusting vane 113. However, due to changes in ambient pressure P1 and air density associated with changes in altitude, it may be desirable in some embodiments to adjust vane 113 differently at different altitudes. In other words, it may be desirable to provide some altitude compensation to the adjustment of vane 113. In reference to FIG. 6, changes in ambient pressure P1 due to changes in altitude of engine 10 would change the amount of venting of chamber 172 achieved by venting valve 166 and P1 bellows 164, thereby adjusting compensated pressure P3' around P3 bellows 170 so that the angular position of movable member 174 may be adjusted accordingly based on altitude to provide INPUT (P3) that is compensated based on variations in altitude.

In some embodiments, transducer 118 may include a manual override feature similar to that of system 12 that may permit an operator of engine 10 such as a pilot of an aircraft to which engine 10 is mounted, to manually adjust vane 113 via servo valve 114 by bypassing an input that would otherwise be provided by P3 bellows 170. Such override feature may include override cam 72 configured to engage with movable member 174 via follower 180 and spring 182, and provide manual positional adjustment of movable member 174. Spring 182 may be a coil spring. Override cam 72 may be operatively connected to be controllable via override lever 74, which may be disposed in a cockpit of the aircraft for example. In reference to FIG. 6, rotation of override cam 72 may urge movable member 174 to cause rotation of movable member 174 about fulcrum 176. It is understood that override cam 72 could be replaced with another type of actuator for causing movement of movable member 174.

The angular position of movable member 174 about fulcrum 176 may be transmitted to valve member 120 in the form of INPUT(P3) via rod 184, cam plate 186 and pin 188. For example, P3 bellows 170 may be operatively (e.g., pivotally) connected to a first end of movable member 174 and rod 184 may be operatively (e.g., pivotally) connected to a second end of movable member 174 where the first and second ends are on opposite sides of fulcrum 176. In some embodiments, movable member 174 may have a relatively rigid portion 174A that is connected to P3 bellows 170 and a relatively flexible portion 174B that is connected to rod 184. Flexible portion 174B of movable member 174 may be more flexible than rigid portion 174A of movable member 174. As explained further below, flexible portion 174B may be permitted to flex/bend during operation.

The cam arrangement (see FIG. 5) of system 112 for transmitting INPUT(P3) to valve member 120 may be similar or identical to the cam arrangement of system 12. For example, the cam arrangement may include cam slot 190 formed in cam plate 186 which may be pivotally connected via pivot pin 192 to some (e.g., fixed) structure other than valve member 120. Cam slot 190 may be engaged with pin 188 which may be (e.g., indirectly) secured to valve member 120 via shaft 194 so that as cam plate 186 is caused to rotate by transducer 118, the engagement of pin 188 with cam slot 190 causes valve member 120 to rotate according to the selected profile of cam slot 190 to achieve the desired scheduling and positional adjustment of vane 13.

In some embodiments, transducer 118 may include optional pressure ratio (PR) servo 196 that may serve to magnify the force transferred by movable member 174 to rod 184 in some situations. For example, PR servo 196 may compensate for changes in the magnitude of force required to actuate the cam arrangement of system 112 due to changes in environmental conditions for example. In some situations, changes in temperature could result in changes in friction coefficients in the cam arrangement and/or in servo valve 114 thereby requiring different amounts of force required to actuate valve member 120 and transmit the correct INPUT (P3) to valve member 120. The use of PR servo 196 and flexible portion 174B of movable member 174 may allow for such changes in force requirements without significantly affecting the interaction between P3 bellows 170 and movable member 174.

PR servo 196 may include actuator 198, which may be a double-acting linear actuator configured to cause positional adjustment of rod 184 to transfer INPUT(P3) to valve member 120 according to the angular position of movable member 174. Actuator 198 may include piston 200 for actuation of rod 184. Actuator 198 may include first chamber 202A and second chamber 202B disposed on opposite sides of piston 200 for causing actuation of piston 200 by controlling the flow of fluid into and out of chambers 202A, 202B. In some embodiments, a relatively small orifice 203 may be provided through piston 130 to establish some fluid communication between chambers 202A and 202B to permit a relatively small amount of fluid circulation and maintain a relatively fresh supply of fluid being used in actuator 198.

PR servo 196 may include nozzles 204A, 204B that are each configured to receive pressurized fluid at pressure PR through respective orifices. Nozzles 204A, 204B may be positioned to discharge the pressurized fluid on opposite sides of movable member 174. The arrangement of nozzles 204A, 204B and movable member 174 may define a dual nozzle flapper. Precision-ground facing surfaces 206 (only one being shown in FIG. 5) may be provided on opposite sides of movable member 174 on which the fluid discharged from nozzles 204A, 204B may impinge. Angular movement of movable member 174 about fulcrum 176 may cause movable member 174 to move toward one nozzle 204A or 204B, and away from the other nozzle 204A or 204B. Such movement may consequently increase the flow resistance out of one nozzle 204A or 204B, and reduce the flow resistance out of the other nozzle 204A or 204B. Such difference in flow resistance may be reflected by changes in pressures PS1 and PS2 inside the respective nozzles 204A and 204B.

Chamber 202A may be in fluid communication with nozzle 204A so that pressure PS1 may be transferred to chamber 202A. Similarly, chamber 202B may be in fluid communication with nozzle 204B so that pressure PS2 may be transferred to chamber 202B. Accordingly, movement of movable member 174 relative to nozzles 204A, 204B may cause changes in pressures PS1 and PS2 and consequently cause actuation of piston 200 and movement of rod 184. In various embodiments, the pressurized fluid supplied to nozzles 204A, 204B may be pressurized air, hydraulic fluid, engine oil provided from an oil system/pump of engine 10 or fuel provided from a fuel system/pump of engine 10. The fluid discharged from nozzles 204A, 204B may be at a lower pressure (e.g., PD) than the pressure PR of the pressurized fluid supplied to nozzles 204A, 204B. In various embodiments, fluid discharged from nozzles 204A, 204B may be returned to an oil drain/scavenging line of the oil system or a return line of the fuel system for example. If the fluid is pressurized air, then the air discharged from nozzles 204A, 204B may be released to the ambient environment.

During operation of transducer 118, a change in compensated pressure P3' may cause a change in length of P3 bellows 170 and consequently cause movement of rigid portion 174A of movable member 174. If the force applied to rod 184 by flexible portion 174B of movable member 174 is insufficient to fully actuate valve member 120, flexible portion 174B may flex/bend to allow rigid portion 174A of movable member 174 to still undergo at least some desired rotation. In other words, flexible portion 174B may accommodate some rotation of rigid portion 174A even if rod 184 is not immediately actuated.

Starting from a null position (i.e., a central position between nozzles 204A and 204B where piston 200 is stationary) of rigid portion 174A of movable member 174, when compensated pressure P3' changes, P3 bellows 170 may exert a force on rigid portion 174A of movable member 174 thereby causing rotation of rigid portion 174A about fulcrum 176. This may cause rigid portion to move from its centered position and become closer to one of nozzles 204, 204B than the other. The movement of rigid portion 174A between nozzles 204A, 204B will cause a differential between pressures PS1 and PS2 (i.e., pressure imbalance across piston 200) and consequently cause piston 200 to move and assist with the movement of rod 184 for delivering INPUT(P3) to valve member 120. As piston 200 moves, it begins to pull on flexible portion 174B which will exert a force on rigid portion 174A in the opposite direction to the force exerted by P3 bellows 170. This will pull rigid portion 174A back toward the null position until the pressures PS1 and PS2 on either side of piston 200 are balanced again, and piston 200 will come to rest at a new linear position. This servo feedback mechanism may result in a linear position of piston 200 that is proportional to compensated pressure P3' sensed by P3 bellows 170. PR servo 196 may supplement (e.g., boost) the force transmitted from movable member 174 to rod 184 and also at least partially isolate such variations in actuation force from P3 bellows 170.

FIGS. 7 and 8 are cross-sectional views of servo valve 114. FIG. 7 is a cross-sectional view taken along line A1-A1 in FIG. 6, and FIG. 8 is a cross-sectional view taken along line A2-A2 in FIG. 6. FIG. 7 shows an inner side of first cover 162A of servo valve 114. First cover 162A may include fluid passages 208A and 208B. Fluid passage 208A may convey fluid from actuation port 156A formed in valve member 120 toward chamber 136A of actuator 116. Similarly, fluid passage 208B may convey fluid from actuation port 156B formed in valve member 120 toward chamber 136B of actuator 116. Fluid passages 208A, 208B may each be of arcuate shape. First cover 162A may include arcuate slot 210 extending therethrough in order to permit pin 154 to extend through first cover 162A and actuate PLA spool 122B according to PLA. Fluid passages 208A, 208B may be configured to provide a fluid lock-out position identified by line A where fluid flow from actuation ports 156A, 156B into respective fluid passages 208A, 208B is prevented. It is understood that actuation ports 156A, 156B may be sized to serve as metering orifices that provide the desired response of servo valve 114 based on a PLA input via PLA spool 122B. Alternatively or in addition, such metering orifice(s) could be provided anywhere along the fluid path between metering lands 214 (see FIG. 9) and actuator 116 (e.g., within servo valve 114 or fluid lines). In some embodiments, two pins 154 (and respective slots 210) could be provided to provide adjustment to PLA spool 122B.

Fluid passages 208A, 208B may be configured to provide an angular offset between lock-out position A and a minimum position of valve member 120 in order to inhibit adjustment of vane 13 based on PLA below a threshold position of valve member 120. Such angular offset θ may be useful during starting of engine 10 where the PLA spool 122B would be disabled below a threshold INPUT(P3) that is determined by angular offset θ. During starting of engine 10, the PLA may be set at a "ground idle" position while engine 10 spools up from zero to the ground idle setting. Accordingly, the angular position of vane 13 may be controlled only or primarily by the pressure ratio (e.g., pressure P3/pressure P1) during starting. FIG. 8 shows the angular range of motion of PLA spool 122B indicated by arrow R1. In some embodiments, the angular range of motion of valve member 120 may be substantially the same as the angular range of motion of PLA spool 122B.

FIG. 9 is a cross-sectional view of servo valve 114 taken along line B-B in FIG. 6. This cross-sectional view is taken through PLA spool 122B and also through valve member 120. Valve member 120 is shown at a null position relative to PLA spool 122B so that no fluid flow is permitted through actuation ports 156A, 156B. In some embodiments, lands 214 that are provided on PLA spool 122B and that are shown to be facing actuation ports 156A, 156B in FIG. 9 may be wider than actuation ports 156A, 156B in order to provide an angular PLA dead band indicated as DB. PLA dead band DB locks out adjustment of vane 13 based on PLA during slow acceleration or steady state operation of engine 10. PLA adjustments that represent greater accelerations and that are large enough to cause PLA spool 122B to rotate beyond PLA dead band DB will cause some adjustment of vane 13. Accordingly, PLA dead band DB may result in adjustment of vane 13 based on PLA only when an absolute magnitude of the change in PLA is greater than a non-zero threshold value.

FIG. 9 shows a configuration suitable to provide lag-type behavior for PLA-based adjustment of vane 113. For example, in response to a positive adjustment of power lever 146 (i.e., engine acceleration), PLA spool 122B would rotate in the positive direction (clockwise) to cause fluid at pressure PR to enter port 156B and be delivered to chamber 136B of actuator 116 in order to cause positional adjustment of vane 113 following a rise in compressor discharge pressure P3 that would cause such adjustment of vane 113 based on INPUT(P3) via valve member 120. The lag-type behavior may provide a delayed change in position of vane 113 compared to relying only on INPUT(P3) for the adjustment of vane 113. The magnitude of the lag-type response may be set by way of selecting the geometry of passages and/or actuation ports 156A, 156B shown in FIG. 9. For example, more narrow actuation ports 156A, 156B that are more restrictive to fluid flow would provide a lag-type response of higher magnitude. On the other hand, larger actuation ports 156A, 156B that are less restrictive to fluid flow would provide a lag-type response of lower magnitude.

The configuration of FIG. 9 could be modified to provide lead-type behavior for PLA-based adjustment of vane 113. For example, switching fluid pressures PR and PD would convert the configuration of FIG. 9 to a lead-type arrangement.

In some engine applications, a lag between signal INPUT (P3) and the opening of vanes 13, 113 may result in shorter acceleration times and/or a greater compressor surge margin during acceleration. Is some engine applications, keeping guide vanes 13, 113 more closed under rapid acceleration may reduce the aerodynamic loading (incidence angle) on the first stage compressor which may either give increased surge margin or the ability to accelerate the engine more rapidly.

A lead compensation arrangement could be desirable if the fully integrated control system inherently has excessive lag. As an example, such lag could be caused by a slow response of the pneumatic portion(s) of the control (e.g.:

large volume of compressible air in the bellows cavity). Accordingly, built-in lead compensation could overcome some of the excessive lag. Lead-type behavior may also be used to cause an earlier adjustment of vane 13 without having to wait for compressor discharge pressure P3 to catch up. Accordingly, this may improve the response of engine 10 to transient conditions. In other words, the use of PLA spool 122B may provide a feedforward-type control of vane 13 in response to changes in position of power lever 146.

Actuation ports 156A, 156B in FIG. 9 could also be configured to provide different compensation types for acceleration and deceleration (e.g., lag compensation for acceleration and lead compensation for deceleration or vice versa). As an example, this could be achieved by making port 156A come in fluid communication with pressure PR during both directions of rotation of the PLA spool while port 156B would come in fluid communication with pressure PD in both directions of rotation.

FIG. 10 shows curves C1, C2 and C3 representing the angular position of vane 113 plotted as a function of time indicating exemplary responses of system 112 to INPUT (P3). Curve C1 represents a response of system 112 to an exemplary INPUT(P3) without lead- or lag-type behavior associated with PLA. Curve C2 represents a response of system 112 to the same INPUT(P3) where PLA spool 122B and valve member 120 (see FIG. 9) are configured to provide a lead-type behavior. Curve C3 represents a response of system 112 to the same INPUT(P3) where PLA spool 122B and valve member 120 (see FIG. 9) are configured to provide a lag-type behavior. The region between curve C2 and curve C3 may provide a tunable band within which servo valve 114 may be tuned to provide the desired response. Tuning may be achieved by adjusting the size of metering land(s) 214 and/or with the installation of flow-restricting orifices somewhere along the flow path between metering land(s) 214 and actuator 116.

FIG. 11 is a cross-sectional view of servo valve 114 taken along line C-C in FIG. 6. This cross-sectional view is taken through vane spool 122A and also through valve member 120. Valve member 120 is shown at a null position relative to vane spool 122A so that no fluid flow is permitted through actuation ports 140A, 140B. In some embodiments, lands 216 that are provided on vane spool 122A and that are shown to be facing actuation ports 140A, 140B in FIG. 11 may be about the same width or only slightly wider than actuation ports 140A, 140B so that no significant dead band is provided between valve member 120 and vane spool 122A. In some embodiments, actuation ports 140A, 140B may be larger in size (i.e., less flow-restrictive) than actuation ports 156A, 156 in order to permit vane 13 to be adjusted by tracking valve member 120 even if there is no change in PLA. Such sizing of actuation ports 140A, 140B may also permit the use of manual override lever 74 to manually schedule vane 113 via pressure ratio servo 196. However, vane 113 could move at a reduced rate and may potentially have a reduced accuracy under manual control in some situations.

Figure 12:
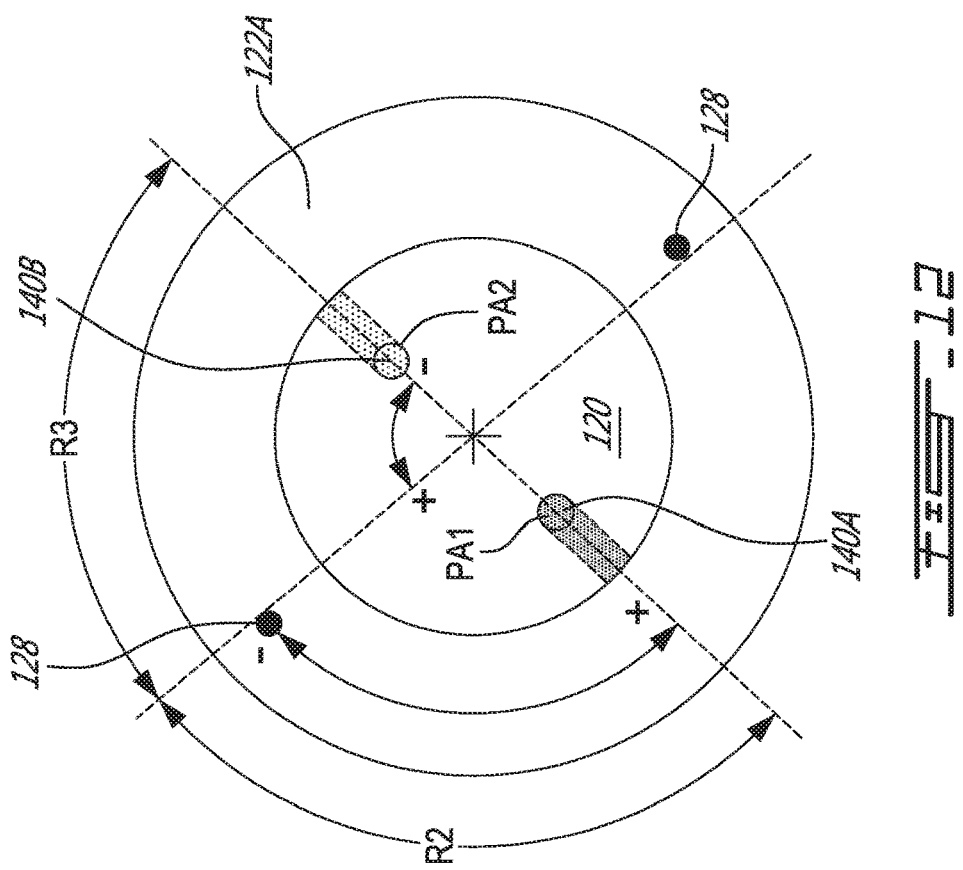
FIG. 12 is a cross-sectional view of the rotary servo valve of the system of FIG. 6 taken along line D1-D1 in FIG. 6.

FIG. 12 is a cross-sectional view of servo valve 114 taken along line D1-D1 in FIG. 6. FIG. 12 shows actuation ports 140A, 140B of valve member 120 in relation to vane spool 122A. The angular range of motion of vane spool 122A is indicated by arrow R2. The angular range of motion of valve member 120 is indicated by arrow R3.

Figure 13:
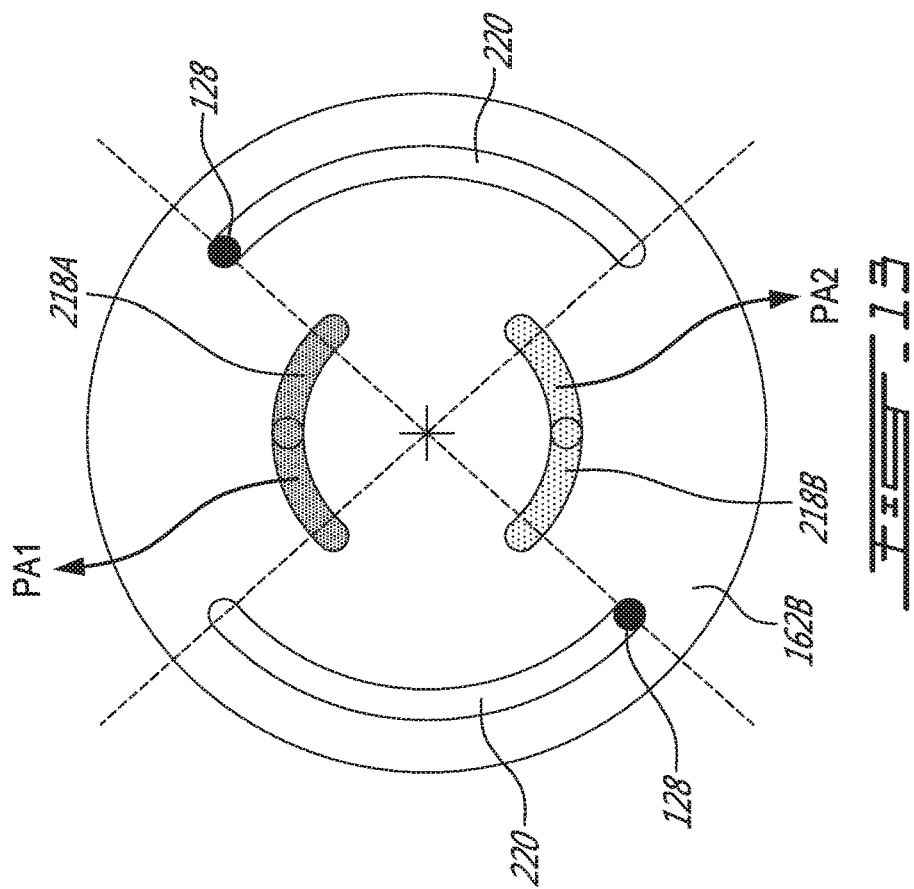
FIG. 13 is a cross-sectional view of the rotary servo valve of the system of FIG. 6 taken along line D2-D2 in FIG. 6.

FIG. 13 is a cross-sectional view of servo valve 114 taken along line D2-D2 in FIG. 6. FIG. 13 shows an inner side of second cover 162B of servo valve 114. Second cover 162A may include fluid passages 218A and 218B. Fluid passage 218A may convey fluid from actuation port 140A formed in valve member 120 toward chamber 136A of actuator 116. Similarly, fluid passage 218B may convey fluid from actuation port 140B formed in valve member 120 toward chamber 136B of actuator 116. Fluid passages 218A, 218B may each be of arcuate shape. Second cover 162B may include arcuate slots 220 extending therethrough in order to permit pins 128 to extend through second cover 162B and actuate vane spool 122A to provide feedback F of the angular position of vane 113. In some embodiments, a single pin 128 (and slot 220) could be provided to provide adjustment of vane spool 122A. The interaction of valve member 120 and vane spool 122A for causing positional adjustment of vane 113 may be substantially the same as explained above in relation to servo valve 32.

Figure 14:
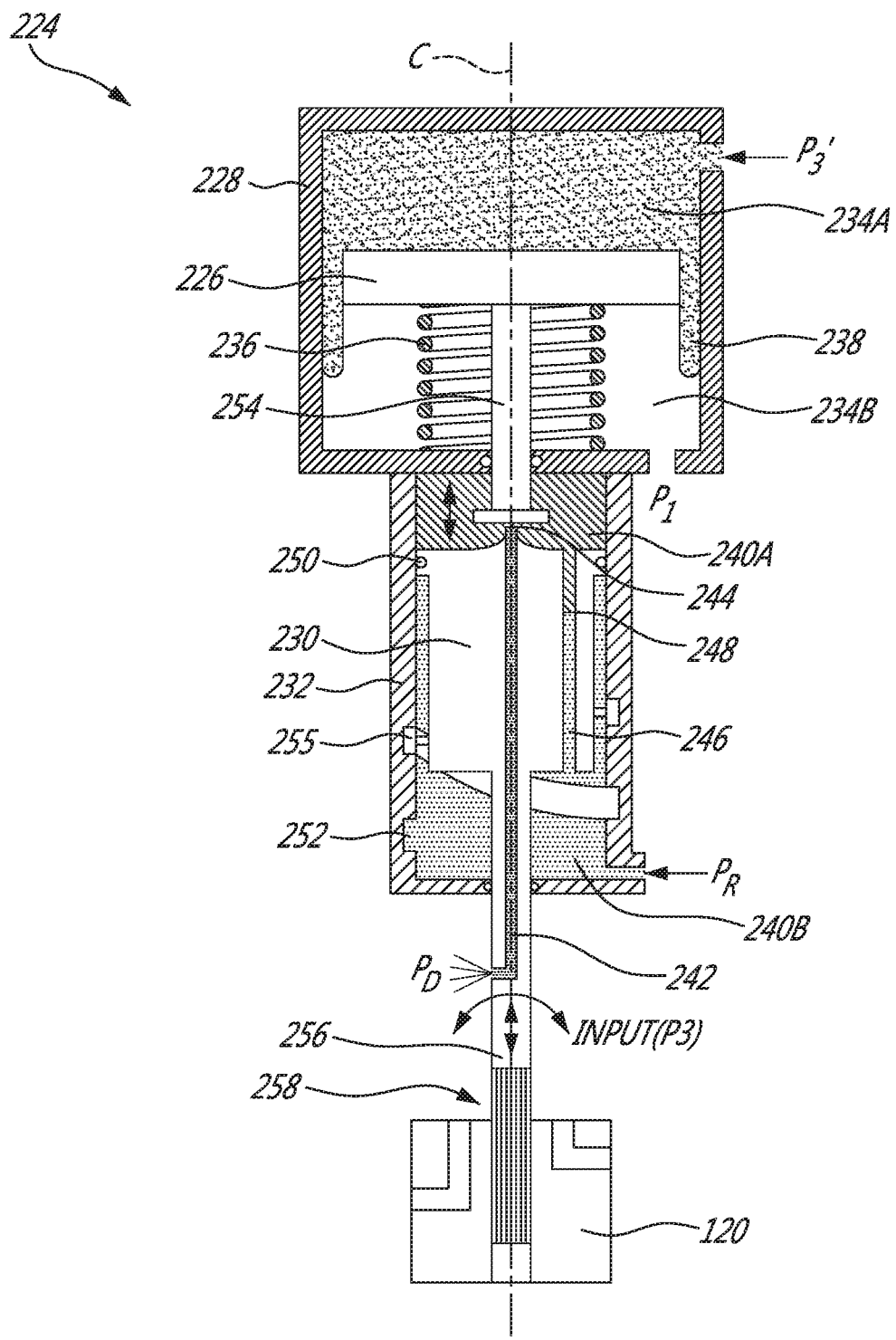
FIG. 14 is a schematic representation showing another exemplary transducer of a system for controlling one or more variable position vanes.

FIG. 14 is a schematic representation showing another exemplary transducer 224 of a system for controlling one or more variable position vanes 13. Transducer 224 may be integrated into systems 12 or 112 described above. Transducer 224 may serve to generate INPUT(P3) based on compensated pressure P3'. For example, transducer 224 may be used in conjunction with the arrangement of P1 bellows 164 and venting valve 166 in order to receive compensated pressure P3' (see FIG. 6). Based on compensated pressure P3', transducer 224 may produce INPUT(P3) in angular form to central valve member 120 of servo valve 114 for example. Transducer 224 may be integrated into system 112 by replacing components such as P3 bellows 170, movable member 174, PR servo 196, cam plate 186 and associated components for example. Transducer 224 may also be integrated with system 12 by replacing transducer 36 (shown in FIG. 2) for example.

Transducer 224 may include first piston 226 disposed movably inside first housing 228 and second piston 230 movably disposed inside second housing 232. First housing 228 may define chamber 234A on one side of first piston 226 and chamber 234B on an opposite side of first piston 226. Chamber 234A may be in communication with compensated pressure P3' and chamber 234B may be in communication with ambient pressure P1. Spring 236 may be disposed inside chamber 234B and resiliently bias first piston toward chamber 234A. In some embodiments, chambers 234A and 234B defined inside first housing 228 may have a cylindrical shape having a generally circular cross-sectional profile in a plane that is perpendicular to axis C. Chambers 234A and 234B may be substantially fluidically sealed from each other via suitable sealed interface. In some embodiments, a sealed interface may be provided between first piston 226 and one or more internal walls of first housing 228. In some embodiments, a flexible membrane 238 (e.g., diaphragm) may provide a sealed boundary between chambers 234A and 234B and also be sufficiently flexible to accommodate movement of first piston 226 along axis C. Membrane 238 may be sealing attached to one or more internal walls of housing 228. Changes in differences in pressure between ambient pressure P1 and compensated pressure P3' may result in movement of piston 226 along axis C. In some embodiments, membrane 238, first piston 226 and spring 236 could be replaced with a suitable bellows and spring arrangement.

Second housing 232 may define chamber 240A on one side of second piston 230 and chamber 240B on an opposite side of second piston 230. Chamber 240A may be in communication with pressure PD (describe above) via passage 242 having opening 244 into chamber 240A. Chamber 240B may be in communication with pressure PR (described above) where pressure PR may be higher than pressure PD during operation. Chambers 240A and 240B may be in fluid communication with each other via passage 246 and flow restriction 248 (calibrated orifice or choke). A suitable seal 250 such as an O-ring may be disposed between second piston 230 and one or more internal walls of second housing 232. In some embodiments, chambers 240A and 240B defined inside second housing 228 may have a cylindrical shape having a generally circular cross-sectional profile in a plane that is perpendicular to axis C. Second housing 232 may also have one or more helical grooves 252 for engagement with one or more followers 255 such as rollers that are connected to second piston 230. Second piston 230 may be configured for translation along axis C and also rotation about axis C. Due to the engagement of followers 255 on second piston 230 with helical groove 252, second piston 230 may undergo simultaneous and coordinated translational and rotational movement based on the pitch of helical groove 252. It is understood that instead of rollers, followers 255 could include one or more tabs, threads or other member(s) configured to frictionally engage with helical groove 252. Similarly, it is understood that helical groove 252 could be replaced by a helical protrusion (e.g., rail).

During operation of transducer 224, changes in compensated pressure P3' relative to ambient pressure P1 may cause translational movement of first piston 226 along axis C. When such movement is toward second piston 230 (e.g., downward in FIG. 14), the movement of first piston 226 may be transmitted to second piston 230 by the engagement of push rod 254 with second piston 230. The resulting translational movement of second piston 230 will also cause rotation of second piston 230 and of output shaft 256 that is fixedly connected to or is integrally formed with second piston 230. A distal end of output shaft 256 may be drivingly engaged with central valve member 120 of servo valve 114 via splined connection 258 that allows rotation of output shaft 256 to be transmitted to central valve member 120 while accommodating the translation of output shaft 256 along axis C relative to central valve member 120.

The higher pressure PR relative to the lower pressure PD may bias second piston 230 toward first piston 226 (e.g., upward in FIG. 14) and may also limit the rate of movement of second piston 230 due to the presence of flow restriction 248. Opening 244 of passage 242 may be disposed at a contact interface between push rod 254 and second piston 230. Accordingly, when push rod 254 is urging second piston 230, opening 244 may be substantially blocked so that fluid communication between passage 242 and chamber 240A is substantially prevented. The blocking of opening 244 of passage 242 may result in a build up of pressure in chamber 240A and result in the pressure in chamber 240A to be close to the pressure in chamber 240B. However, since the surface area of piston 230 exposed to the pressure in chamber 240A is larger than the surface area of piston 230 exposed to the pressure in chamber 240B (due to the presence of output shaft 256 on that side), this results in a force imbalance that pushes piston 230 downward until opening 244 is pulled far enough away from the sealing face of push rod 254 that an equilibrium of hydraulic forces is re-established and piston 230 stops at a new position. Likewise, when piston 226 moves upward, it causes opening 244 to open resulting in a pressure drop in chamber 240A and an upward force results until piston 230 moves enough to re-block opening 244 at a new equilibrium position of piston 230.

When compensated pressure P3 and ambient pressure P1 cause first piston 226 to move away from second piston 230 (e.g., upward in FIG. 14), push rod 254 may become disengaged from second piston 230 so that first piston 226 does not pull second piston 230. When push rod 254 becomes disengaged from second piston 230, opening 244 may become unblocked so that fluid communication between chamber 240A and passage 242 may be established or restored. The difference in pressure PD and pressure PR may urge second piston 230 toward first piston 226 and cause chamber 240A to shrink. Since opening 224 is unblocked, fluid (e.g., air, hydraulic fluid, engine oil, fuel) from chamber 240A may be vented out of chamber 240A via passage 242 to accommodate the shrinking of chamber 240A and permit second piston 230 to move toward first piston 226 to establish contact with push rod 254 and re-close opening 244.

It is understood that components of systems 12 and 112 can be manufactured using known materials suitable for aerospace applications for example, and accordingly to known manufacturing processes.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A system for adjusting a variable position vane in an aircraft engine, the system comprising:
    a fluid-actuated actuator operatively connected to cause positional adjustment of the variable position vane;
    a servo valve including a rotatable valve member and a rotatable spool, the valve member and the spool being separately rotatable about a common axis, the valve member cooperating with the spool to control a flow of fluid to the fluid-actuated actuator, the servo valve configured to control the flow of fluid to the fluid-actuated actuator based on an angular positional setting of the valve member relative to an angular positional setting of the spool defined by an input indicative of a pressure of air pressurized by a compressor of the aircraft engine and positional feedback from the variable position vane; and
    a transducer configured to generate the input to the servo valve based on a received signal indicative of the pressure of the air pressurized by the compressor of the aircraft engine.

2. The system as defined in claim 1, wherein the input includes the angular positional setting of the valve member.

3. The system as defined in claim 2, wherein the positional feedback from the variable position vane includes the angular positional setting of the spool.

4. The system as defined in claim 1, wherein the transducer converts a pressure differential to a linear position.

5. The system as defined in claim 4, wherein:
    the transducer includes a bellows;
    an interior of the bellows is exposed to the pressure of the air pressurized by the compressor; and
    an exterior of the bellows is exposed to an ambient pressure.

6. The system as defined in claim 5, including a movable member having a position indicative of the linear position provided by the transducer, the movable member being urged in a first direction by a biasing member and urged in a second direction opposite the second direction by the bellows.

7. The system as defined in claim 6, including a temperature-sensitive element configured to preload the biasing member as a function of temperature.

8. The system as defined in claim 1, including a manual override device manually controllable from a cockpit of an aircraft to which the aircraft engine is mounted and configured to manually adjust the input to the servo valve generated by the transducer.

9. The system as defined in claim 4, including:
a pinion gear coupled for common rotation with the valve member; and
a rack operatively connected between the pinion gear and the transducer to cause adjustment of the pinion gear based on the linear position provided by the transducer.

10. The system as defined in claim 4, including a cam operatively coupled to convert the linear position provided by the transducer to the angular positional setting of the valve member.

11. The system as defined in claim 1, wherein the spool is a first spool and the system includes a second spool configured to cooperate with the valve member to control the flow of fluid to the fluid-actuated actuator based on an input indicative of a change in power lever angle.

12. The system as defined in claim 11, wherein the second spool and the valve member are configured to control the flow of fluid to the fluid-actuated actuator based on the input indicative of the change in power lever angle only when a magnitude of the change in power lever angle is greater than a non-zero threshold.

13. The system as defined in claim 11, wherein the second spool and the valve member are configured to use the input indicative of power lever angle to provide a lead-type response when causing the positional adjustment of the variable position vane based on the input indicative of the pressure of air pressurized by the compressor.

14. The system as defined in claim 11, wherein the second spool and the valve member are configured to use the input indicative of power lever angle to provide a lag-type response when causing the positional adjustment of the variable position vane based on the input indicative of the pressure of air pressurized by the compressor.

15. The system as defined in claim 11, wherein the input indicative of the power lever angle includes a positional setting of the second spool.

16. The system as defined in claim 1, wherein the transducer is configured to adjust the input to the servo valve based on a change in altitude.

17. The system as defined in claim 16, including:
a first bellows disposed in a chamber that is in communication with the air pressurized by the compressor, the first bellows being sensitive to a pressure inside the chamber;
a valve actuatable to cause venting of the chamber; and
a second bellows sensitive to an ambient pressure and operatively connected to cause actuation of the valve in response to a change in the ambient pressure.

18. The system as defined in claim 1, wherein the servo valve is a first servo valve and the system includes a second servo valve configured to assist in generating the input to the first servo valve.

19. The system as defined in claim 1, wherein the transducer comprises:
a first piston translatable in response to the signal indicative of the pressure of the air pressurized by the compressor; and
a second piston translatable and rotatable in response to translation of the first piston, the rotation of the second piston corresponding to the input to the servo valve.

20. An aircraft engine comprising:
an inlet for receiving a flow of air into the aircraft engine;
a variable position vane for guiding the flow of air;
a compressor for pressuring the air; and
a rotary servo valve operatively connected to the variable position vane, the rotary servo valve including a rotatable valve member disposed inside a rotatable spool, the valve member and the spool being separately rotatable about a common axis and cooperating together to cause adjustment of the variable position vane based on a pressure of the air pressurized by the compressor.

21. The aircraft engine as defined in claim 20, including a double-acting fluid-actuated actuator operatively connected to cause positional adjustment of the variable position vane.

22. The aircraft engine as defined in claim 21, wherein the rotary servo valve is configured to control a flow of fuel or of engine oil to the fluid-actuated actuator.

23. The aircraft engine as defined in claim 21, wherein the rotary servo valve is configured to control a flow of air to the fluid-actuated actuator.

24. A system for adjusting a variable position vane in an aircraft engine, the system comprising:
a fluid-actuated actuator operatively connected to cause positional adjustment of the variable position vane;
a servo valve including a valve member cooperating with a spool to control a flow of fluid to the fluid-actuated actuator, the servo valve configured to control the flow of fluid to the fluid-actuated actuator based on an input indicative of a pressure of air pressurized by a compressor of the aircraft engine and positional feedback from the variable position vane; and
a transducer configured to generate the input to the servo valve based on a received signal indicative of the pressure of the air pressurized by the compressor of the aircraft engine;
wherein the spool is a first spool and the system includes a second spool configured to cooperate with the valve member to control the flow of fluid to the fluid-actuated actuator based on an input indicative of a change in power lever angle.

* * * * *